United States Patent
Acquroff et al.

(10) Patent No.: US 11,344,116 B2
(45) Date of Patent: May 31, 2022

(54) FURNITURE SYSTEM

(71) Applicant: CLICKSTAIR PTY LTD, Braeside (AU)

(72) Inventors: Thomas Fletcher Acquroff, Braeside (AU); Darren Brink, Braeside (AU)

(73) Assignee: CLICKSTAIR PTY LTD, Victoria (AU)

( * ) Notice: Subject to any disclaimer, the term of this patent is extended or adjusted under 35 U.S.C. 154(b) by 0 days.

(21) Appl. No.: 16/978,894

(22) PCT Filed: Mar. 6, 2019

(86) PCT No.: PCT/AU2019/050191
§ 371 (c)(1),
(2) Date: Sep. 8, 2020

(87) PCT Pub. No.: WO2019/169439
PCT Pub. Date: Sep. 12, 2019

(65) Prior Publication Data
US 2021/0045528 A1 Feb. 18, 2021

(30) Foreign Application Priority Data

Mar. 6, 2018 (AU) .................................. 2018900723

(51) Int. Cl.
*A47B 47/04* (2006.01)
*A47B 96/02* (2006.01)
*F16B 5/00* (2006.01)

(52) U.S. Cl.
CPC .......... *A47B 47/042* (2013.01); *A47B 96/024* (2013.01); *A47B 96/027* (2013.01); *F16B 5/008* (2013.01)

(58) Field of Classification Search
CPC ... A47B 47/042; A47B 96/024; A47B 96/027; A47B 5/00; A47B 57/14; A47B 57/045;
(Continued)

(56) References Cited

U.S. PATENT DOCUMENTS 3,033,376 A * 5/1962 Eastman .............. A47B 96/022
108/42
3,397,496 A * 8/1968 Sohns ....................... E04B 1/54
52/286

(Continued)

FOREIGN PATENT DOCUMENTS

AU 2003100924 A4 1/2004
DE 20304209 U1 5/2003
(Continued)

OTHER PUBLICATIONS

International Search Report and Written Opinion from PCT Application No. PCT/AU2019/050191, dated Jun. 18, 2019.
(Continued)

*Primary Examiner* — Ko H Chan
(74) *Attorney, Agent, or Firm* — Workman Nydegger

(57) ABSTRACT

A furniture system is provided having a support to be mounted to an upright structure of a building, and a shelf that is assembled onto the support. The shelf has a load-bearing surface, a front side, and a rear side with a first connector. The support has an outer face that includes at least one second connector. The first and second connectors are configured to interconnect such that, in the assembled the furniture system, the shelf is supported by the support with the load bearing surface projecting horizontally away from the upright structure, the first and second connectors resist rotation of the shelf about the first and second connectors by a force acting downwardly through the load bearing surface, and the first and second connectors resist disconnection of the shelf from the support by force applied to the shelf in a direction that is normal to the support.

20 Claims, 23 Drawing Sheets

(58) Field of Classification Search
CPC ..... A47B 57/10; A47B 96/067; A47B 95/008; A47B 47/0075; A47B 2220/0036; F16B 5/008; F16B 5/0614; A47F 5/0846
See application file for complete search history.

(56) References Cited

U.S. PATENT DOCUMENTS

| | | | | |
|---|---|---|---|---|
| 3,527,175 | A * | 9/1970 | Kapnek | A47B 96/066 108/152 |
| 5,503,277 | A | 4/1996 | O'Brien | |
| 6,345,481 | B1 * | 2/2002 | Nelson | E04F 15/02 52/592.2 |
| 6,467,636 | B1 * | 10/2002 | Schaefer | A47B 96/022 108/147.11 |
| 6,772,568 | B2 * | 8/2004 | Thiers | B32B 21/042 52/592.1 |
| 6,962,016 | B1 * | 11/2005 | Meyer | A47G 1/0605 40/700 |
| 7,654,055 | B2 * | 2/2010 | Ricker | A47B 47/0075 52/592.1 |
| 7,708,252 | B2 * | 5/2010 | Vander Berg | A47B 96/061 248/544 |
| 8,082,859 | B2 * | 12/2011 | Sevack | A47B 96/066 108/152 |
| 9,185,979 | B1 * | 11/2015 | Jenks | A47B 96/066 |
| 10,588,412 | B2 * | 3/2020 | Graber | A47B 96/028 |
| 2007/0079561 | A1 | 4/2007 | Hopkins | |
| 2010/0308702 | A1 | 12/2010 | Apgood, II et al. | |
| 2011/0126487 | A1 * | 6/2011 | Browning | E04B 1/34321 52/586.1 |
| 2011/0280655 | A1 | 11/2011 | Maertens et al. | |
| 2016/0222673 | A1 | 8/2016 | Brink | |

FOREIGN PATENT DOCUMENTS

| | | |
|---|---|---|
| GB | 2322795 A | 9/1998 |
| WO | 2004000079 A1 | 12/2003 |
| WO | 2014013096 A1 | 1/2014 |

OTHER PUBLICATIONS

Extended Search Report from European Application No. 19764272.1, dated Nov. 11, 2021.

* cited by examiner

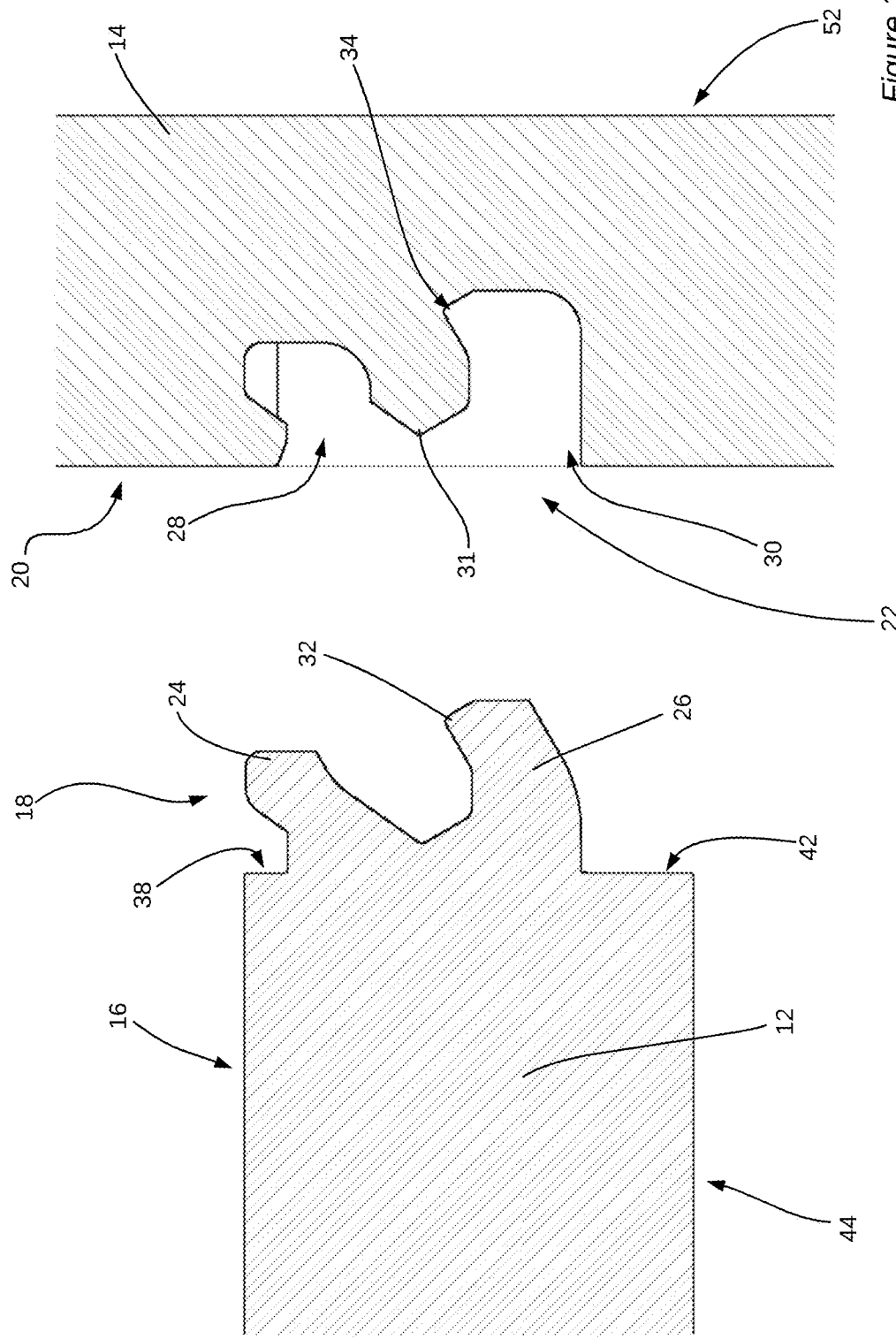

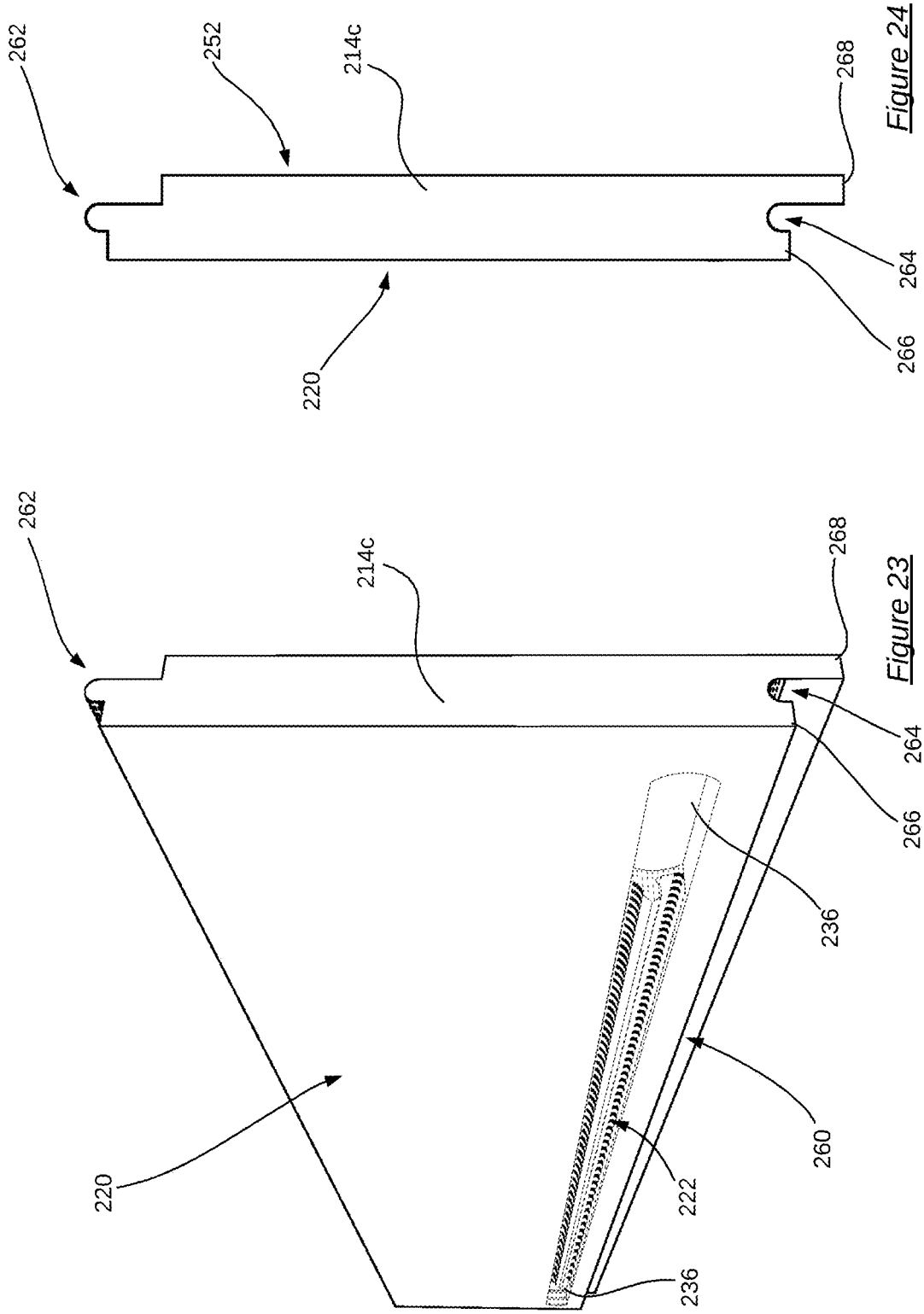

FURNITURE SYSTEM

FIELD OF THE INVENTION

The present invention relates to a furniture system, of the type that include a shelf.

BACKGROUND

It is known to use furniture systems that include one or more shelves in both residential and commercial buildings. Such shelves provide a convenient surface on which to store small items (such as books, ornaments, electrical devices, etc.) above the floor of a building. Shelves that are manufactured in large volumes are often part of a free standing unit, or individual shelves that are supported by one or more mounting brackets that are secured to an upright structure—such as a wall—of the building.

A "floating" shelf system has the aesthetic appeal of the mounting bracket being concealed behind, and within the shelf system. A disadvantage of an individual "floating" shelf is the typical nominal maximum load limit of the order of 5 kg to 15 kg, depending on the length of shelf, type of wall, and type of fasteners used.

It is also known to use mounting arrangements that are fastened to an upright structure of a building above the floor, and have the capability of supporting multiple shelves. Exposed parts of the mounting arrangement detract from the visual appeal of the system.

There is a need to address the above, and/or at least provide a useful alternative.

SUMMARY

There is provided a furniture system comprising:
at least one shelf that has a load bearing surface, a front side, and a rear side with a first connector; and
a support that is to be mounted to an upright structure of a building, the support having an outer face that includes at least one second connector, the first and second connectors being configured to interconnect such that, in the assembled the furniture system:
the shelf is supported by the support with the load bearing surface projecting horizontally away from the upright structure,
the first and second connectors resist rotation of the shelf about the first and second connectors by a force acting downwardly through the load bearing surface, and
the first and second connectors resist disconnection of the shelf from the support by force applied to the shelf in a direction that is normal to the support,
wherein:
the first and second connectors have a first interlocking tongue and groove pair, and a second interlocking tongue and groove pair,
the tongues of the first and second interlocking tongue and groove pairs extend in a direction so as to be parallel to the load bearing surface of the shelf when the furniture system is assembled, and
the shelf is assembled onto the support by:
positioning the shelf with respect to the support such that the first interlocking tongue and groove pair form a hinge about which the shelf can pivot, and such that the second interlocking tongue and groove pair are substantially disengaged, and
pivoting the shelf with respect to the support about the hinge, thereby forcing the second interlocking tongue and groove pair into engagement.

Preferably, the rear side of the shelf further comprises a rear surface that is adjacent the first connector and that includes an upper portion, wherein in the assembled furniture system the upper portion abuts the outer face of the support such that the first and second connectors are concealed when viewed from above the shelf.

In some embodiments, the rear surface includes one or more lateral portions, wherein in the assembled furniture system, each lateral portion abuts the outer face of the support such that the first and second connectors are concealed when viewed from the side of the respective lateral portion.

Preferably, the rear surface including a lower portion that is beneath the first connector with respect to the load bearing surface, wherein in the assembled furniture system the lower portion abuts the outer face of the support. In the assembled furniture system, the first and second connectors are concealed by the abutment of the lower portion with the outer face when viewed from below the shelf. Alternatively or additionally, the lower portion of the rear surface is configured such that, in the assembled furniture system, the abutment of the lower portion with the outer face establishes a second fulcrum when torque is applied to the shelf by a force that acts downwardly through the load bearing surface.

In at least some embodiments, the support includes one or more mounting points for mounting the support to the upright structure, the mounting points including a first mounting point that is vertically spaced from the second connector.

Preferably, the first mounting point is vertically spaced from the second connector by at least half the depth of the shelf. More preferably, the first mounting point is vertically spaced from the second connector by less than three quarters of the depth of the shelf. Even more preferably, the first mounting point is vertically spaced from the second connector by approximately two thirds of the depth of the shelf.

In certain embodiments, the length of the first connector is less than the width of the shelf at the rear side. The length of the second connector can be less than the width of the support. Preferably, the length of the first connector is less than the length of the second connector.

In at least some embodiments, the first connector comprises upper and lower tongues that project rearwardly of the load bearing surface, and the second connector comprises upper and lower grooves formed in the support.

Preferably, the support includes channels at each end of the second connector that each extend in a direction generally parallel with the upper and lower grooves. Preferably, the depth of the grooves is less than or equal to the depth of the channels.

Preferably, the second connector has a ridge formation between the upper and lower grooves. The ridge formation can be recessed with respect to the outer face of the support.

In one form, the upper tongue and upper groove are configured such that, when the shelf is assembled on the support with the lower tongue located within the lower groove, the upper tongue is positively locked within the upper groove by complementary shaping of the upper tongue and upper groove.

In one form, the lower tongue includes an upwardly projecting lip, and the lower groove has a complementary-shaped recess, and wherein, when the shelf is assembled on the support, the lip locates within recess to resist disconnection of the shelf from the support by force applied to the shelf in a direction that is normal to the support.

Preferably, the lower groove is shaped so that the lower tongue is deflected as the lower tongue and groove are brought into engagement. In certain embodiments, the lower tongue is in an undeflected position when the lower tongue and groove are in a fully engaged position.

The furniture system can further comprise a rear mount that is configured to be fastened to the upright structure and that includes a connecting member, and wherein the support includes a rear face that is opposite the outer face, and a complementary connecting element formed on the rear face at the first mounting point, and wherein the connecting member interconnects with the complementary connecting element to retain the support on the rear mount.

In some embodiments, the connecting member is a hooking formation, and the complementary connecting element is configured to receive the hooking formation such that the support is retained on the rear mount by gravity.

Preferably, the hooking formation is elongate, and the complementary connecting element extends transversely across the rear face. In some embodiments, the complementary connecting element is longer than the hooking formation. In certain embodiments, the complementary connecting element is an elongate slot that is oblique to the rear face.

The support can include a rebate, and the complementary connecting element is disposed within the rebate, wherein the rebate is dimensioned such that when the connecting member is interconnected with the complementary connecting element the rear face abuts an upright surface of the upright structure.

The furniture system can further comprise a catch that, in the assembled furniture system, is configured or is configurable to inhibit disassembly of the respective shelf from the support. More preferably, the catch is configured or is configurable to inhibit a disassembly rotation of the shelf about the hinge that would cause disengagement of the second connector.

In certain embodiments, the catch is arranged such that when the shelf is assembled onto the support, the catch can be toggled between a blocking position in which the catch inhibits a disassembly rotation of the shelf, and an open position in which the catch does not inhibit a disassembly rotation of the shelf.

The catch can be configured such that, when in the blocking position, the catch forms interferences with both the shelf and the support. In some embodiments, the catch includes:
a pin,
a guide hole that is formed in the shelf and has an opening on the rear side of the shelf, the pin being able to reciprocate within the guide hole, and
a pocket formed in the support, the pocket being shaped to receive the pin,
wherein:
when the catch is in the open position, the pin is at least substantially located within the guide hole, and
when the shelf is assembled onto the support and the catch is in the blocking position, the pin projects outwardly from within the guide hole and into the pocket.

The pin can further comprise a toggle hole that extends transversely to the reciprocating direction of the pin, and the shelf can further comprise an access slot that intersects the guide hole and opens onto an underside surface of shelf that is opposite the load bearing surface, whereby a tool passed through the access slot is locatable in the toggle hole and move the pin between the blocking and open positions.

In some forms, the pin and guide hole are shaped to prevent rotation of the pin within the guide hole.

In some embodiments, the furniture system comprises a plurality of like shelves, and the support includes a plurality of like second connectors that are vertically spaced along the outer face, whereby in the assembled furniture system the first connector of each shelf is interconnected with a respective one of the second connectors.

In some embodiments, the support includes a plurality of support modules that each have at least one second connector, and are interconnectable to form a vertical array. In some embodiments, the support has tongue and groove connections between the modules, whereby the support modules are configured to be assembled into the vertical array with the tongue and groove connections interconnected with one another.

The plurality of support modules include at least a top support module that includes a groove formation along at least a portion of its bottom edge, and a bottom support module that includes a tongue formation along at least a portion of its top edge. Preferably, the plurality of support modules includes one or more intermediate support modules, wherein each intermediate support modules has a tongue formation along at least a portion of its top edge and a groove formation along at least a portion of its bottom edge.

In at least some embodiments, each groove formation includes a groove on either side of a front lip and a rear lip, and wherein each tongue formation has a shape that complements the shape of the groove formations. Preferably, the rear lip projects further from the groove than the front lip. In some embodiments, the rear lip provides an additional one of the mounting points with which to mount the support to an upright structure.

The present invention also provides a method of manufacturing a shelf of a furniture system, the shelf having a load bearing surface, a front side, and a rear side with a first connector that is to interconnect with a complementary connector on a support of the furniture system,
the method involving forming the shelf from a shelf blank that has a rear edge, two lateral edges, and two opposing major surfaces, one of which forms the load bearing surface, or forms a substrate for the load bearing surface;
wherein forming the shelf further involves:
forming a profiled surface in a region adjacent the rear edge of the shelf blank by one or more material removal operations that each remove material from the shelf blank, a portion of the profiled surface including the first connector; and
docking material from the shelf blank in at least one region that is adjacent the rear edge and a respective one of the lateral edges;
whereby, in the completed shelf, the length of the first connector is less than the width of the shelf at the rear side of the load bearing surface.

In at least some embodiments of the method, the docking material steps occur after forming the profiled surface. In such embodiments, the docking material steps can involve removing material from the profiled surface to form two ends of the first connector.

The docking material step can involve docking material from the shelf blank in two regions that are each adjacent the rear edge and a respective one of the lateral edges of the shelf blank.

Preferably, forming the profiled surface involves forming a planar portion between the portion of the profiled surface that includes the first connector, and an adjacent one of the major surfaces. More preferably, the planar portion is perpendicular to the adjacent major surface.

Alternatively or additionally, forming the profiled surface involves forming two planar portions that are each between a respective one of the major surfaces, and the portion of the profiled surface that includes the first connector. Preferably, the two planar portions are perpendicular to the respective adjacent major surface. More preferably, the two planar portions are coplanar with each other.

In certain embodiments, the docking material steps form two lateral planar portions that, in the completed shelf, are each between an end of the first connector and one of two lateral sides of the shelf.

More preferably, the material removal operations involved in forming the profiled surface are performed with one or more rotary cutting tools that each move relative to the shelf blank in a direction that is parallel to the major surfaces of the shelf blank.

The method can further involve removing material from the shelf blank to form at least one blind hole that is to correspond with a guide hole in the completed shelf, the blind hole extending inwardly into the shelf blank in a direction parallel to at least the first major surface, wherein the blind hole is shaped to receive a pin of the furniture system.

Preferably, in the completed shelf, the guide hole opens onto the rear side of the shelf, and the pin can be wholly located within the guide hole.

The method can further involve removing material from the shelf blank to form at least one access slot that extends transversely with respect to the guide hole, intersects with the guide hole, and opens onto the major surface of the shelf blank that is to be opposite the load bearing surface in the completed shelf.

The present invention also provides a method of manufacturing a support of a furniture system, the support having an outer face with at least one second connector, which is accessible on the outer face, and which is configured to interconnect with a first connector on a rear side of a shelf of the furniture system,
the method involving forming the support from a support blank that has a bottom edge, two lateral edges, and two opposing major surfaces, a first one of which forms the outer face, or forms a substrate for the outer face;
wherein forming the support further involves, for each second connector:
forming a profiled surface within the support blank by one or more material removal operations that each remove material from the support blank in a direction that is generally inwardly from the first major surface towards the other of the major surfaces, a portion of the profiled surface including the second connector; and
forming two recessed surfaces in the shelf blank that are each recessed with respect to the first major surface, whereby, in the completed support, each second connector extends between two recessed surfaces.

Preferably, each of the recessed surfaces is positioned inwardly of the lateral edges of the support blank.

In at least some embodiments, forming the recessed surfaces occurs prior to forming the profiled surface, such that each recessed surface provides a void that facilitates access for one or more tools that are used during the step of forming the profiled surface.

More preferably, the material removal operations involved in forming the profiled surface are performed with one or more rotary cutting tools that each move relative to the support blank in a direction that is parallel to the major surfaces of the support blank.

Each of the recessed surfaces can be deeper than the deepest part of the profiled surface. In some embodiments, each of the recessed surfaces is a channel that extends parallel to the bottom edge of the shelf blank.

Preferably, the material removal operations also involve removing material from the support blank in a direction that is generally parallel to the bottom edge of the support blank.

The method can further involve removing material from the support blank to form at least one pocket that extends inwardly into the support blank from the first of the major surfaces and that is shaped to receive a pin of the furniture system, the pocket having a cross-sectional shape that complements the cross-sectional shape of the pin.

Preferably, forming at least one pocket involves forming a blind hole in the support blank.

In certain embodiments, the support is one of a plurality of support modules that are interconnectable to form a vertical array in the assembled furniture system, and the method further involves removing material from at least a portion of the bottom edge of the support blank to form a groove formation in the support module that is shaped to complement a tongue formation on at least a portion of the top edge of another support module of the furniture system.

Alternatively or additionally, the method further involves removing material from at least a portion of the top edge of the support blank to form a tongue formation in the completed support module that is shaped to complement a groove formation on at least a portion of the bottom edge of another support module of the furniture system.

The material removal operations involved in forming the groove and/or tongue formations can be performed with one or more rotary cutting tools that each move relative to the support blank in a direction that is generally parallel to the major surfaces of the support blank.

In some embodiments, the method further involves removing material from the support blank to form at least one elongate slot in the shelf blank, the elongate slot extending inwardly of a second of the major surfaces towards the first of the major surfaces, wherein the elongate slot is shaped to receive a rear mount of the furniture system that is configured to be fastened to an upright structure of a building.

Preferably, the elongate slot extends transversely across and/or obliquely to the second major surface.

The method can further involve removing material from the support blank to form a rebate within the second major face the support blank, wherein in the completed support, the opening of the elongate slot is within the rebate. The formation of the rebate can be completed before or after the formation of the elongate slot.

BRIEF DESCRIPTION OF THE DRAWINGS

In order that the invention may be more easily understood, embodiments will now be described, by way of example only, with reference to the accompanying drawings, in which:

FIG. 10: is a vertical section through part of the shelf and part of support panel of the furniture system of FIG. 1, showing the first and second connectors in detail;

FIG. 23: is a perspective view of an intermediate support panel module of the furniture system shown in FIG. 21;

FIG. 24: is a right side view of the intermediate support panel module shown in FIG. 23;

DETAILED DESCRIPTION

Figure 1:
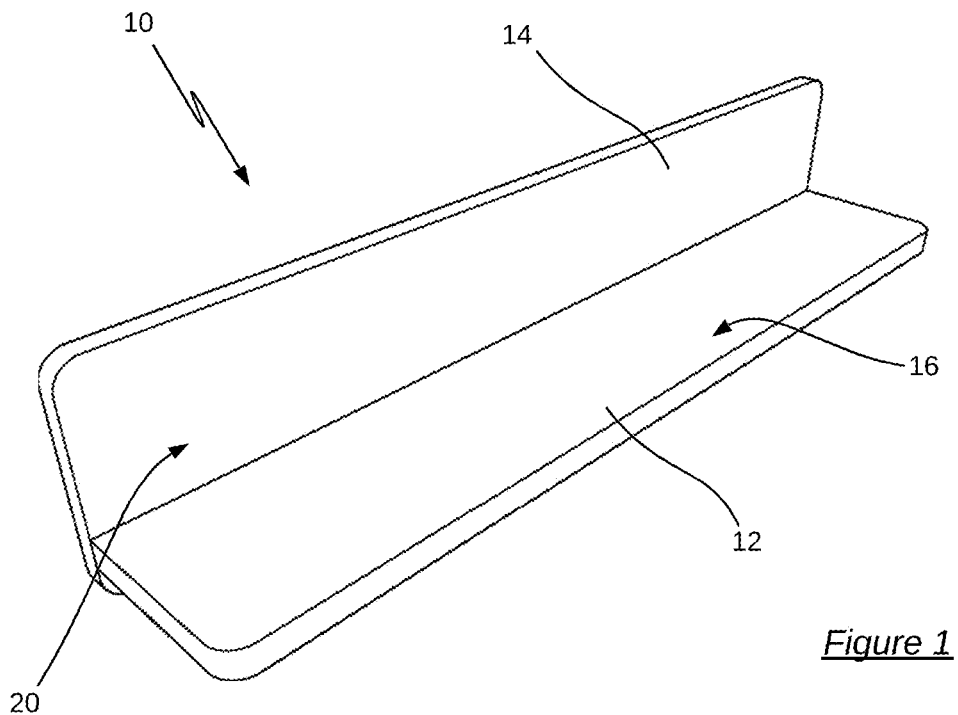
FIG. 1: is a front perspective view of a furniture system according to a first embodiment of the present invention.

FIGS. 1 to 16 relate to a furniture system 10 according to a first embodiment of the present invention. The furniture system 10 includes a shelf 12, and a support panel 14. When installed in a building, the support panel 14 is to be mounted to an upright structure of the building, such as a wall or a wall fascia/cladding. The system 10 is configured such that the shelf 12 is to be supported by the support panel 14 as described below.

The shelf 12 has a load bearing surface 16, a front side, and a rear side with a first connector 18. The support panel 14 has an outer face 20 that includes a second connector 22. The first and second connectors 18, 22 are configured to interconnect such that, in the assembled the furniture system 10, the shelf 12 is supported by the support panel 14 with the load bearing surface 16 projecting horizontally away from the upright structure. As will be appreciated, from FIGS. 1 to 4, the system 10 is arranged such that the shelf 12 is cantilevered from the support panel 14.

The first and second connectors 18, 22 resist a rotation of the shelf 12 about the first and second connectors 18, 22 by a force acting downwardly through the load bearing surface 16. Further, the first and second connectors 18, 22 resist disconnection of the shelf 12 from the support panel 14 by force applied to the shelf 12 in a direction that is normal to the support panel 14.

The first and second connectors 18, 22 have a first interlocking tongue and groove pair, and a second interlocking tongue and groove pair. The tongues of the first and second interlocking tongue and groove pairs extend in a direction so as to be parallel to the load bearing surface 16 of the shelf 12, when the furniture system 10 is assembled. Similarly, the grooves of the first and second interlocking tongue and groove pairs also extend in a direction so as to be parallel to the load bearing surface 16 of the shelf 12, when the furniture system 10 is assembled.

In this particular embodiment, the first connector 18 includes upper and lower tongues 24, 26 that project rearwardly with respect to the load bearing surface 16 of the shelf 12. The second connector 22 includes upper and lower grooves 28, 30 that are formed in the support panel 14.

Figure 12:
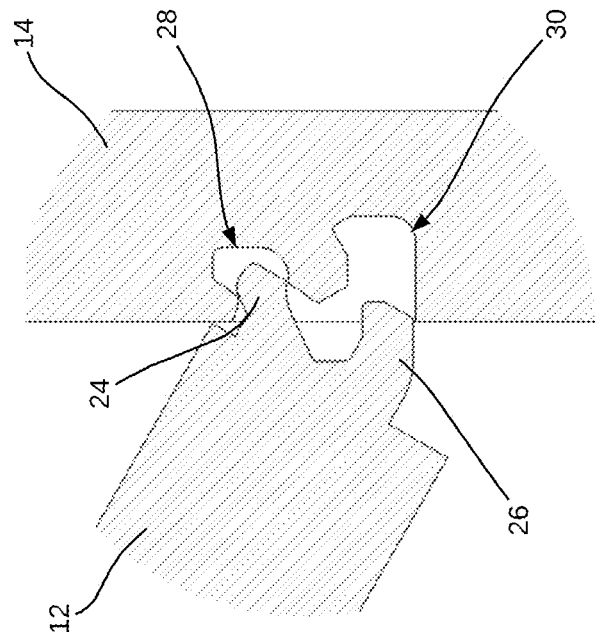
FIG. 12: is an enlarged view of Region A in FIG. 11.
Figure 11:
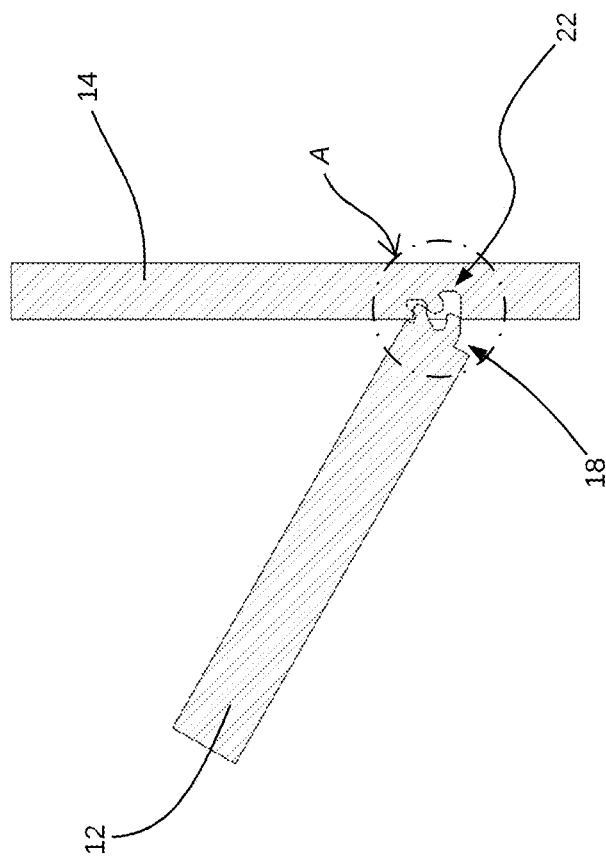
FIG. 11: is a vertical section through the shelf and support panel of the furniture system of FIG. 1, showing the shelf in a first stage of assembly onto the support panel.
Figure 14:
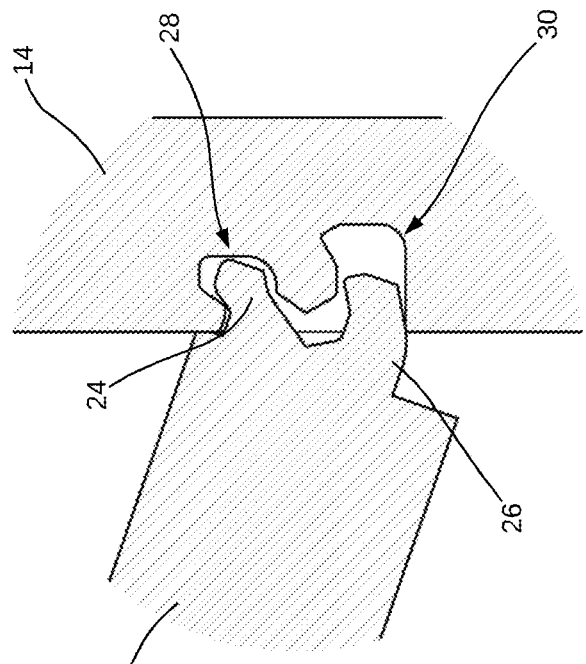
FIG. 14: is an enlarged view of Region B in FIG. 13.
Figure 13:
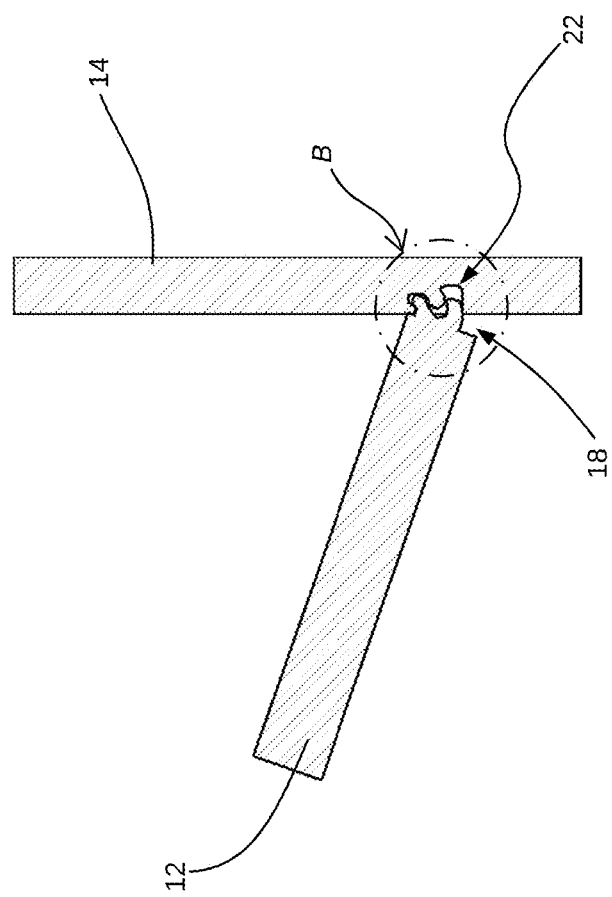
FIG. 13: is a vertical section through the shelf and support panel of the furniture system of FIG. 1, showing the shelf in a second stage of assembly onto the support panel.
Figure 16:
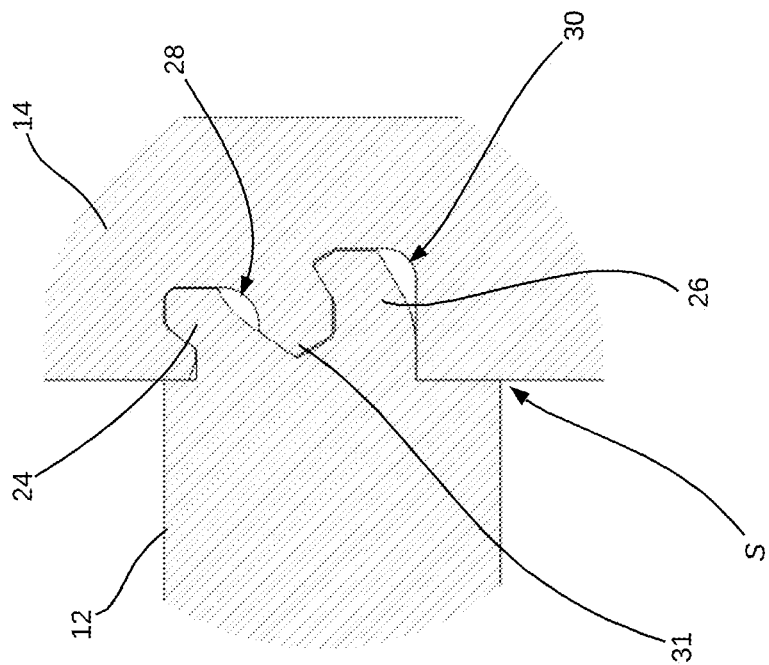
FIG. 16: is an enlarged view of Region C in FIG. 15.
Figure 15:
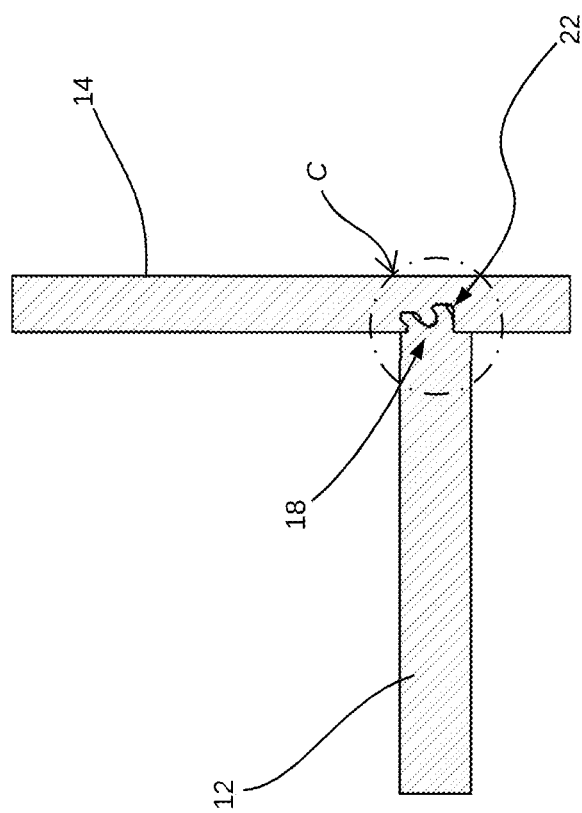
FIG. 15: is a vertical section through the shelf and support panel of the furniture system of FIG. 1, showing the shelf fully assembled onto the support.
Figure 17:
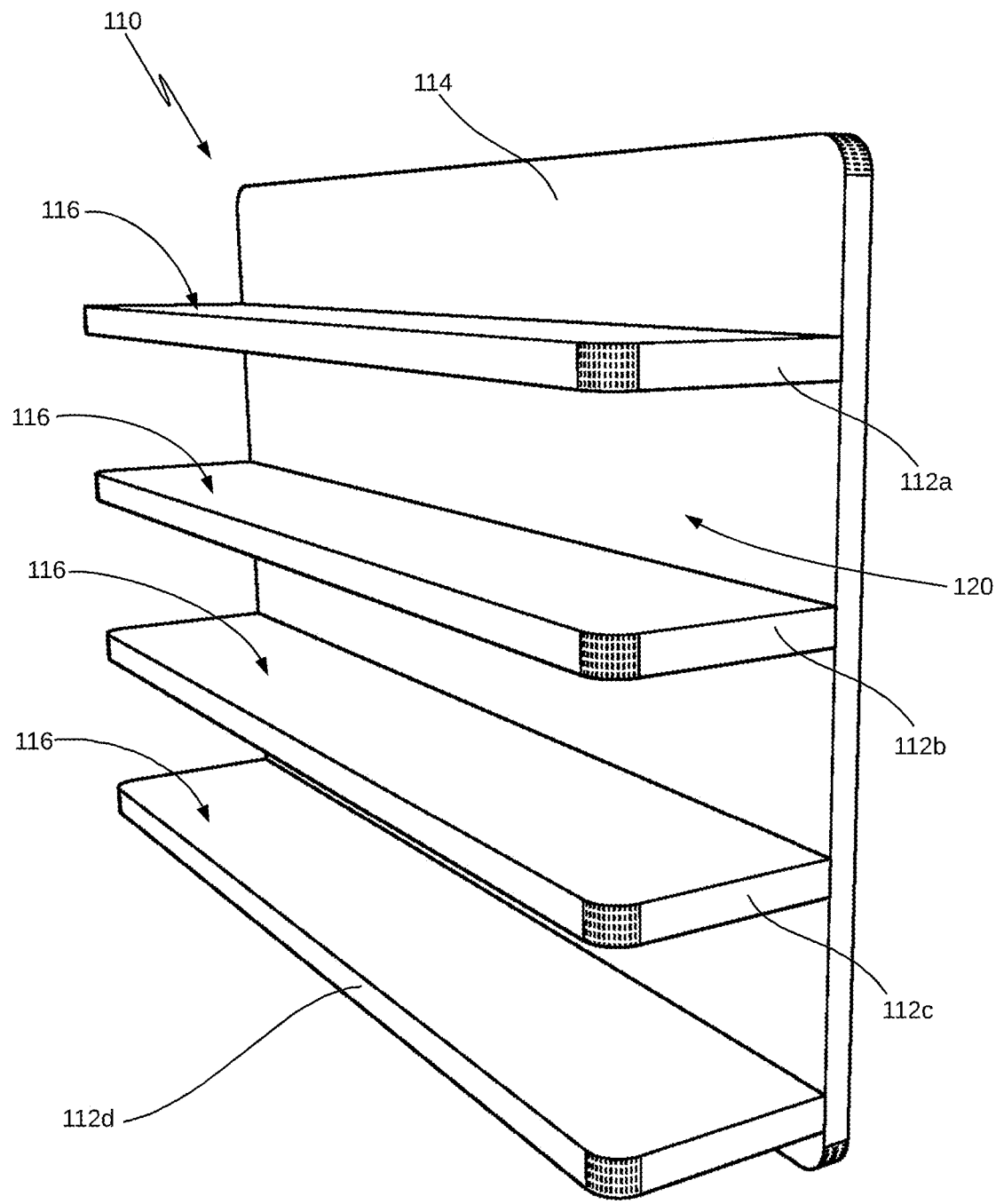
FIG. 17: is a front perspective view of a furniture system according to a second embodiment of the present invention.
Figure 18:
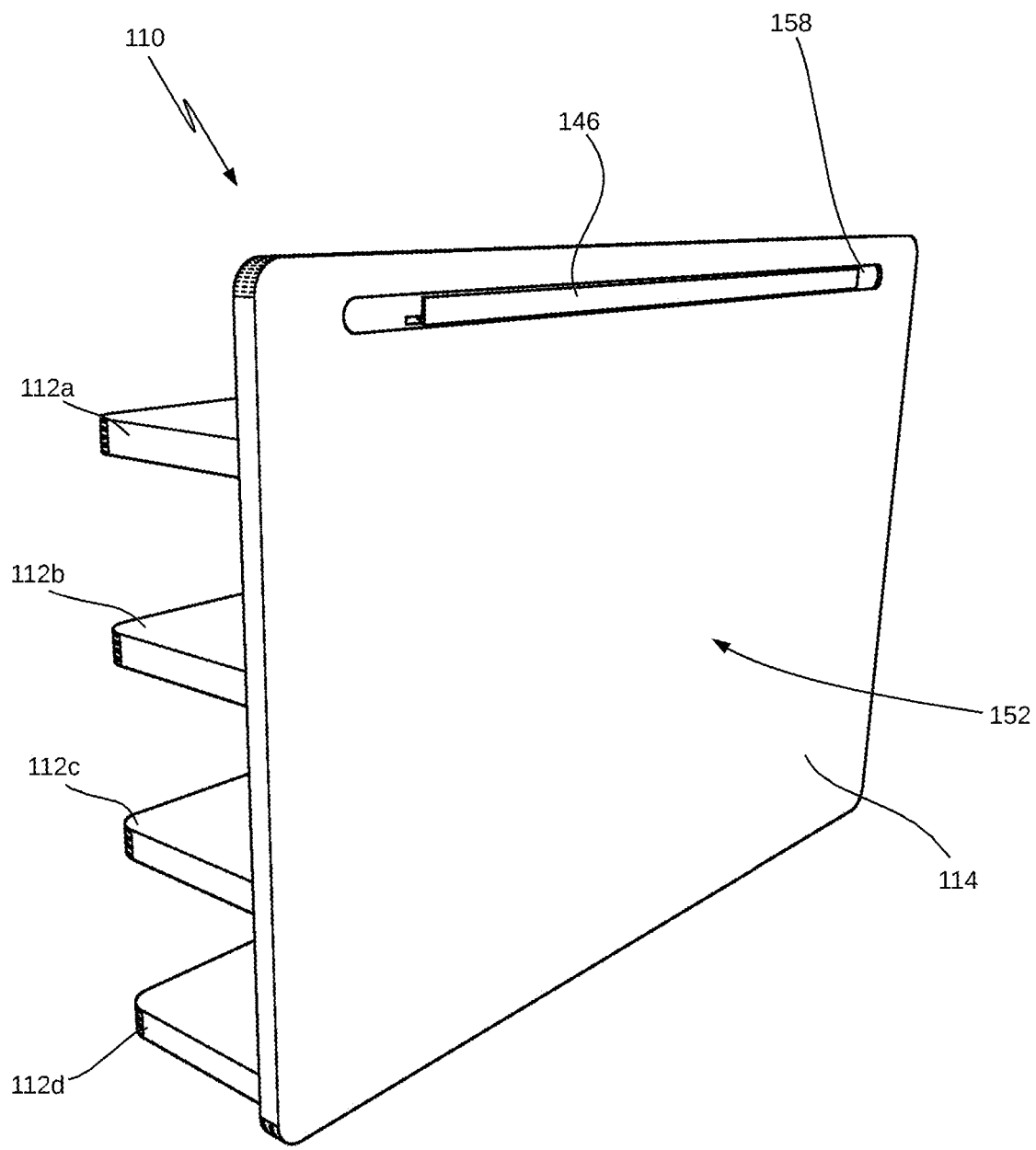
FIG. 18: is a rear perspective view of the furniture system shown in FIG. 23.
Figure 19:
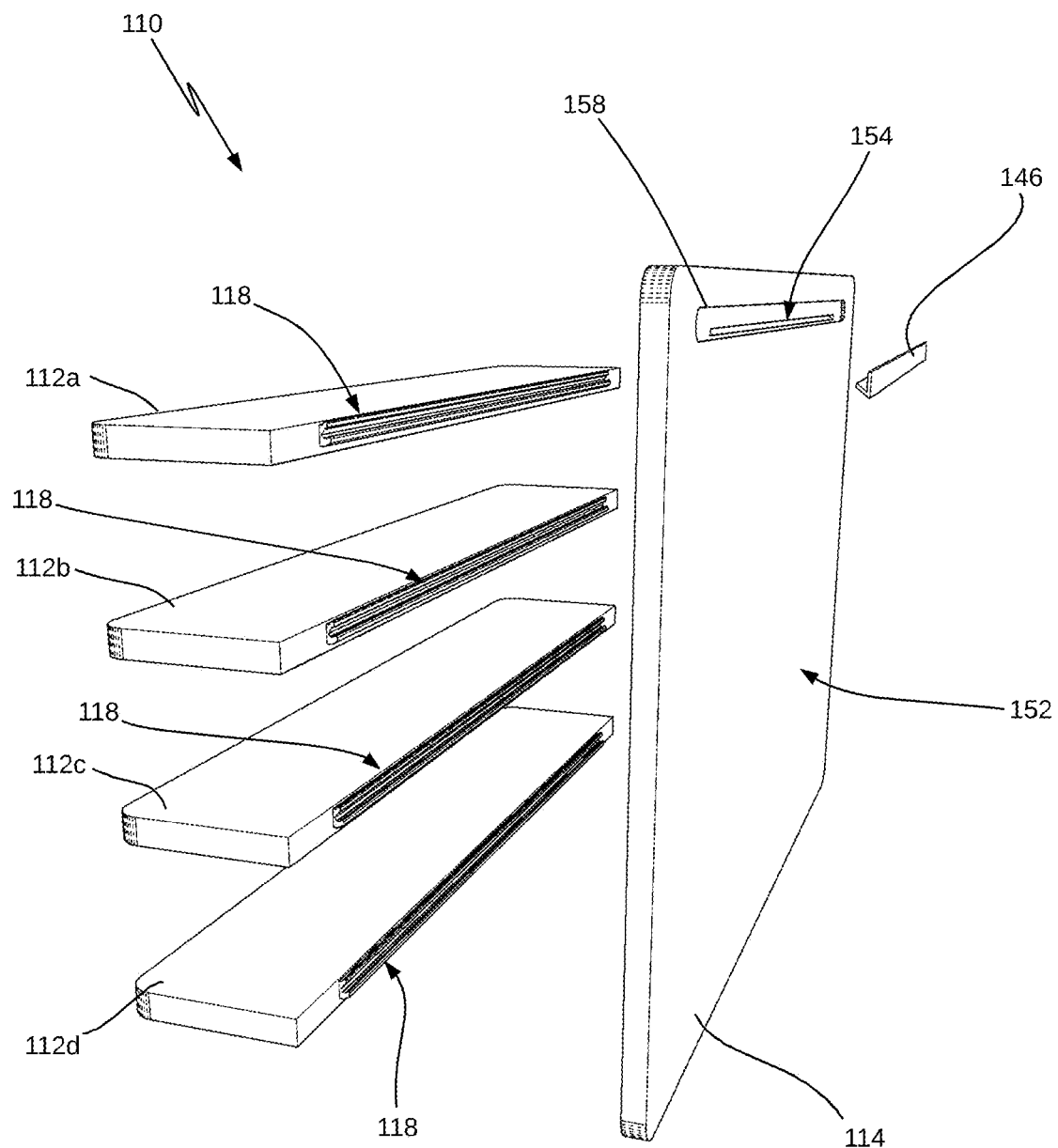
FIG. 19: is an exploded view of the furniture system shown in FIG. 17.
Figure 20:
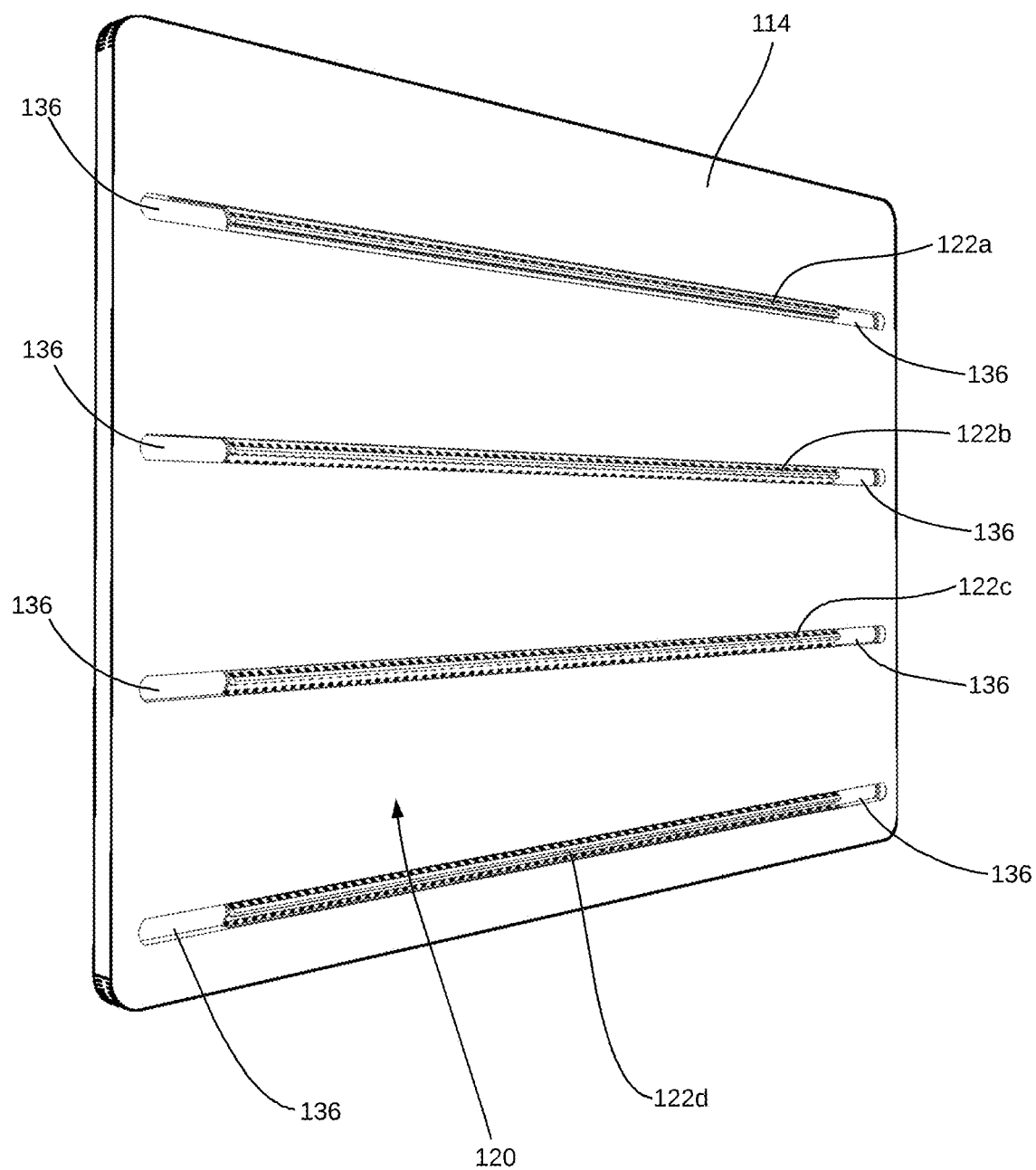
FIG. 20: is a front perspective view of the support panel of the furniture system shown in FIG. 17.
Figure 21:
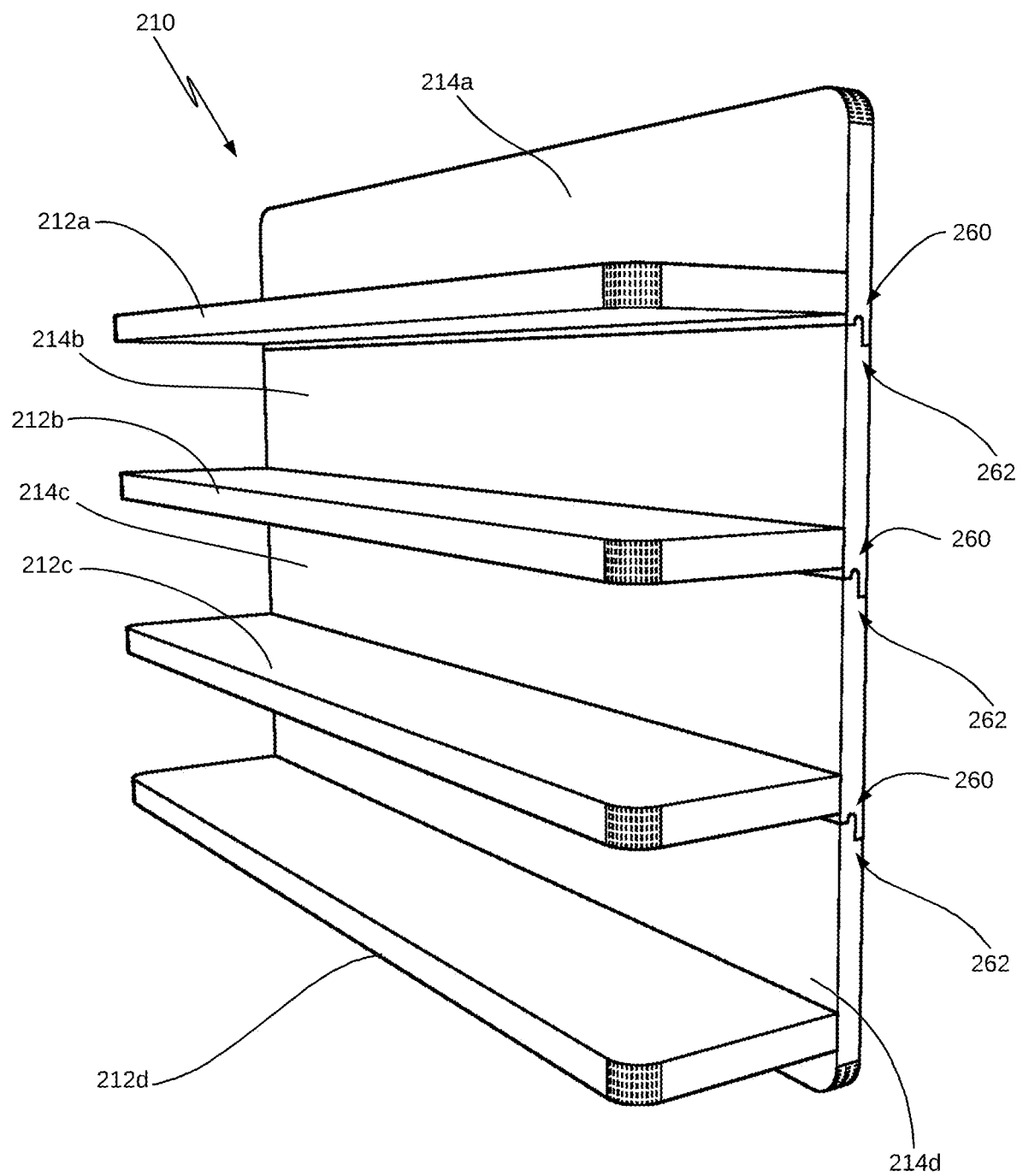
FIG. 21: is a front perspective view of a furniture system according to a third embodiment of the present invention.
Figure 22:
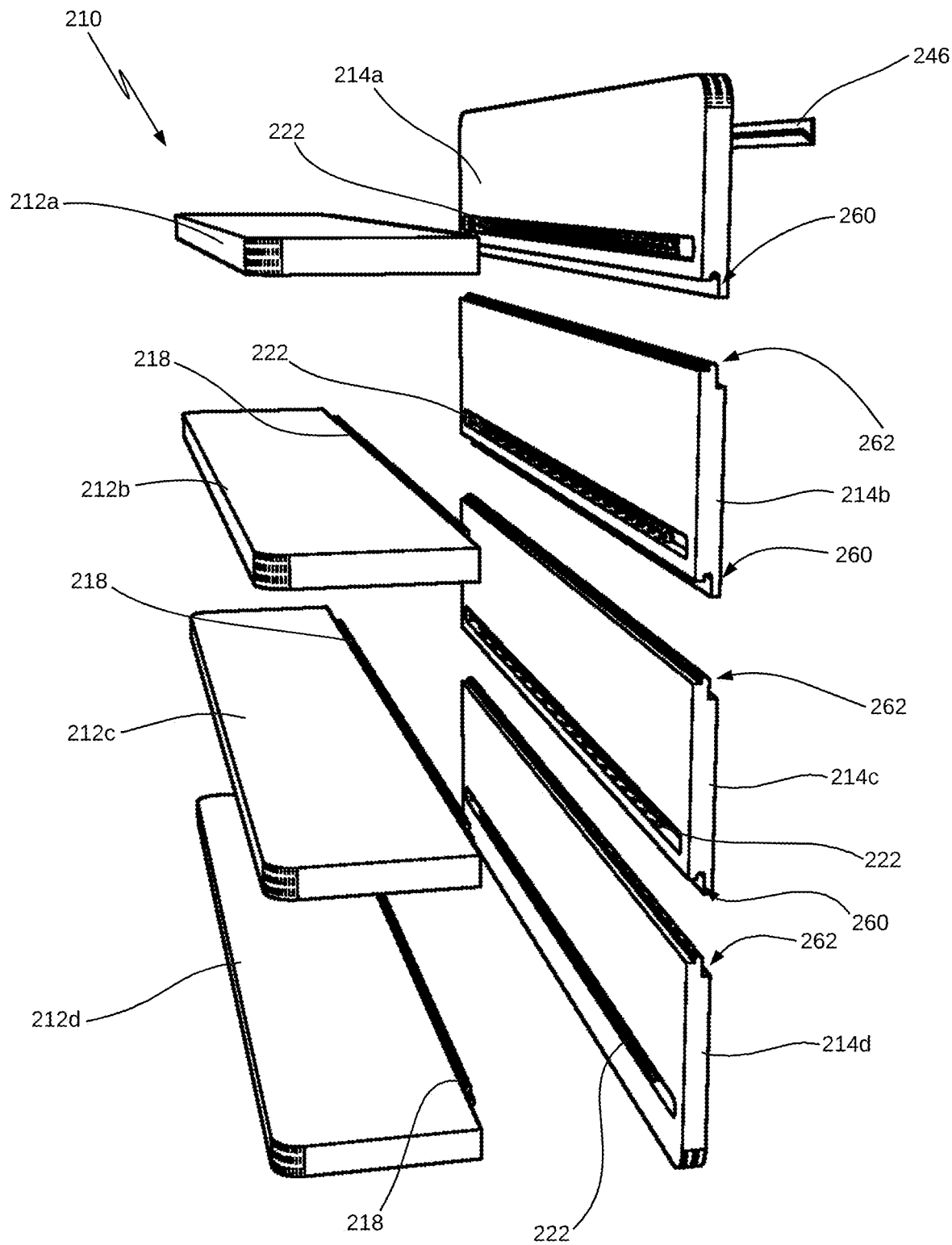
FIG. 22: is an exploded view of the furniture system shown in FIG. 21.

The first and second connectors 18, 22 of this embodiment are shown in further detail in FIGS. 11 to 16. In addition, FIGS. 11 to 16 illustrate the procedure for assembly of the shelf 12 onto the support panel 14. In these Figures:

FIGS. 11 and 12 illustrates the shelf 12 positioned adjacent, and inclined relative to, the support panel 14 (such that the load bearing surface 16 is at an acute angle to the support panel 14)—in this position, the shelf 12 is ready for assembly onto the support panel 14;

FIGS. 11 and 12 illustrate a first stage of assembly of the shelf 12 onto the support panel;

FIGS. 13 and 14 illustrate a second stage of assembly of the shelf 12 onto the support panel; and FIGS. 15 and 16 illustrate the shelf 12 and the support panel 14 in a fully assembled condition.

As will be evident from these Figures, the shelf 12 is assembled onto the support panel 14 by:

1. positioning the shelf 12 with respect to the support panel 14 such that:

the first interlocking tongue and groove pair 24, 28 form a hinge about which the shelf 12 can pivot, and the second interlocking tongue and groove pair 26, 30 are substantially disengaged—which is the first stage of assembly; and 2. then pivoting the shelf 12 with respect to the support panel 14 about the hinge.

As will be appreciated, when the shelf 12 and the support panel 14 are in the fully assembled condition, a force acting downwardly through the load bearing surface 16 will act to drive the upper and lower tongues and groove pairs (24, 28; 26, 30) further into engagement. In this way, the furniture system 10 is able to support substantial loads on the shelf 12.

In this embodiment, the upper tongue 24 and upper groove 28 have complementary shapes, as is particularly evident from FIG. 16. When the shelf 12 is assembled on the support panel 14 with the lower tongue 28 located within the lower groove 30, the upper tongue 24 is positively locked within the upper groove 26 by of the upper tongue 24 and upper groove 26. In other words, the upper tongue 24 and the complementary shape of the support panel 14 defining the upper groove 28 provide an interference that resists disconnection of the shelf 12 from the support panel 14 by force applied to the shelf 12 in a direction that is normal to the support panel 14 (which is right-to-left in the view of FIGS. 15 and 16).

As stated above, during the first stage of assembly the interference of the upper tongue and groove pair 24, 28 creates a hinge about which the shelf 12 can pivot. This hinge facilitates assembly during the second stage, and thus into the fully assembled condition.

In the second stage of assembly, the lower tongue 26 is in contact with the material of the support panel 14 that surrounds the lower groove 30. The lower tongue and groove pair 26, 30 are shaped so that there is frictional resistance as these parts of the system 10 are in contact, and during assembly of the shelf 12 onto the support panel 14. To this end, from the commencement of the second stage through to the fully assembled configuration, there is frictional resistance initially between the lower surface of the lower tongue and groove pair 26, 30, and then also between the leading edge of the lower tongue 26 and the base of the lower groove 30.

The lower tongue 26 includes an upwardly projecting lip 32, and the lower groove 30 has a complementary-shaped recess 34 (both of which are indicated in FIG. 10). When the shelf 12 is assembled on the support panel 14, the lip 32 locates within recess 34 (as particularly shown in FIGS. 15 and 16). The relative positions of the lip 32 and recess 34 also provide resistance to disconnection of the shelf 12 from the support panel 14 by force applied to the shelf 12 in a direction that is normal to the support panel 14.

The lower groove 30 is shaped so that the lower tongue 26 is deflected as the lower tongue and groove 26, 30 are brought into engagement. FIGS. 13 and 14 show the first and second connectors 18, 22 immediately before the lower tongue and groove 26, 30 are brought into engagement; FIGS. 15 and 16 show the first and second connectors 18, 22 immediately after the lower tongue and groove 26, 30 are brought into engagement.

As will be evident from FIG. 16, when the lower tongue and groove pair 26, 30 are in the fully engaged position, the lower tongue 26 is in a substantially undeflected position. In this embodiment, the lower tongue and groove 26, 30 are shaped to provide an over-centre bias on the lower tongue 26 during assembly of the shelf 12 onto the support panel 14. In this way, the first and second connectors 18, 22 have a feel of being positively engaged, as the shelf 12 and support panel 14 are brought into the fully assembled condition.

It will be appreciated that during assembly of the shelf 12 onto the support panel 14, there is frictional resistance and material stress that must be overcome to bring the upper and lower tongue and groove pairs (24, 28; 26, 30) into the fully engaged positions. The creation of the hinge between the upper tongue and groove pair 24, 28 provides a fulcrum against which to work during assembly of the shelf 12 onto the support panel 14.

As will also be appreciated, there is frictional resistance and material stress that must be overcome to bring the upper and lower tongue and groove pairs (24, 28; 26, 30) out of the fully engaged positions, so as to disassemble the shelf 12 from the support panel 14. Accordingly, the first and second connectors 18, 22 resist a disassembly rotation of the shelf 12 about the hinge that would cause disengagement of the lower tongue and groove pair 26, 30 to move out of the fully engaged position. (In this context, a "disassembly rotation" is a rotation of the shelf 12 relative to the support 14 that would cause disengagement of at least lower tongue and groove pair 26, 30, and thus disassembly of the shelf 12 from the support 14.)

The second connector 22 has a ridge formation 31 between the upper and lower grooves 28, 30. The ridge formation 31 is recessed with respect to the outer face 20 of the support panel 14.

In this way, during assembly of the shelf 12 onto the support panel 14, the lower tongue 26 engages the material of the support panel 14 that is beneath the second connector 22, before properly commencing engagement with the lower groove 30. The bottom surface of the lower tongue 26 is shaped so that contact of that bottom surface urges the upper tongue 24 into the upper groove 28. The complementary shapes of the upper tongue and groove pair 24, 28, and in particular the shape of the top surface of the upper tongue 24 and the complementary shape of the support panel 14 defining the upper groove 28, also facilitate location of the upper tongue 24 within the upper groove 28 during assembly of the shelf 12 onto the support panel 14. This contributes towards the formation of the hinge about which the shelf pivots during assembly, and also the positive lock of the upper tongue 24 within the upper groove 28 when the shelf 12 is in the fully assembled configuration on the support panel 14.

As will be appreciated, a channel formation is disposed between the upper and lower tongues 24, 26. In the assembled system 10, the ridge formation 31 of the second connector 22 locates within the channel formation, as shown most clearly in FIG. 16.

Figure 5:
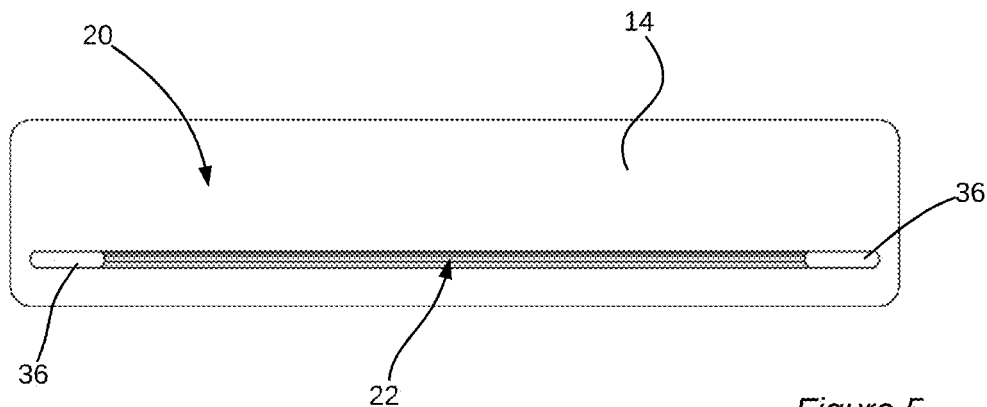
FIG. 5: is a front view of the support panel of the furniture system shown in FIG. 1.
Figure 6:
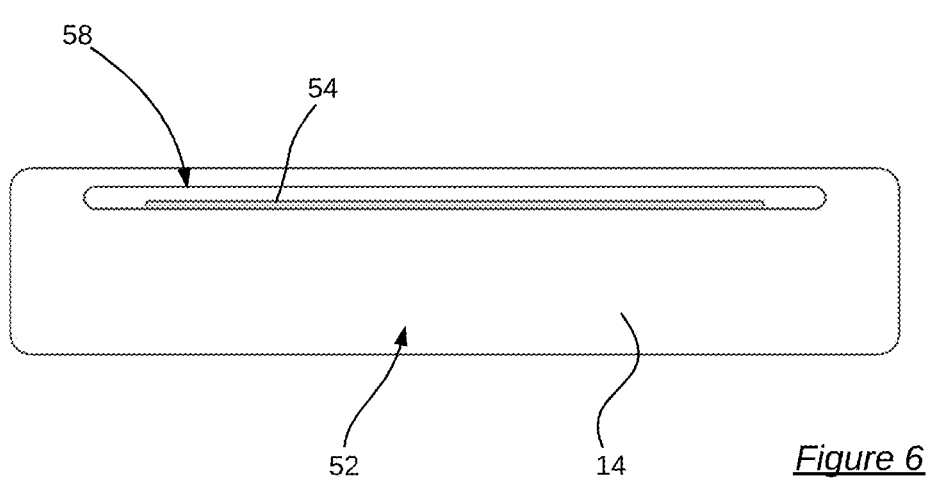
FIG. 6: is a rear view of the support panel shown in FIG. 5.
Figure 7:
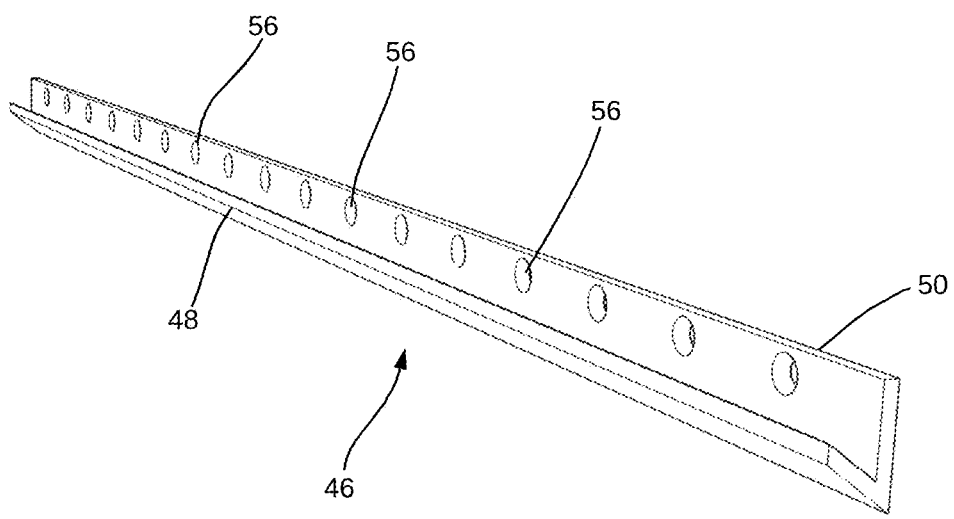
FIG. 7: is a front perspective view of the mounting rail of the furniture system shown in FIG. 1.
Figure 8:
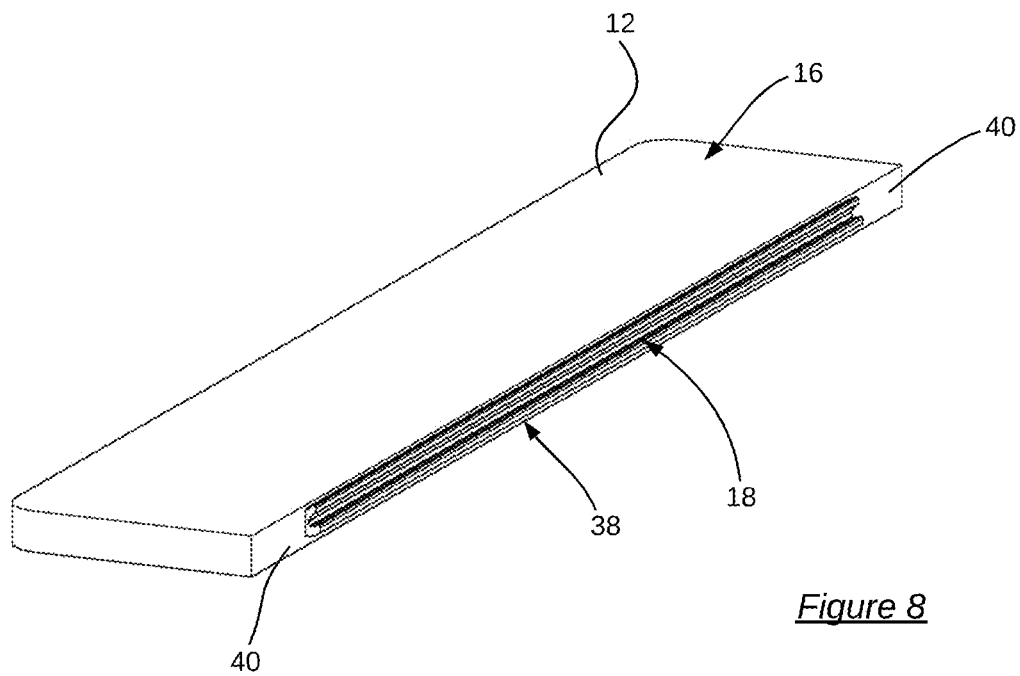
FIG. 8: is a rear perspective view of the shelf of the furniture system shown in FIG. 1.
Figure 9:
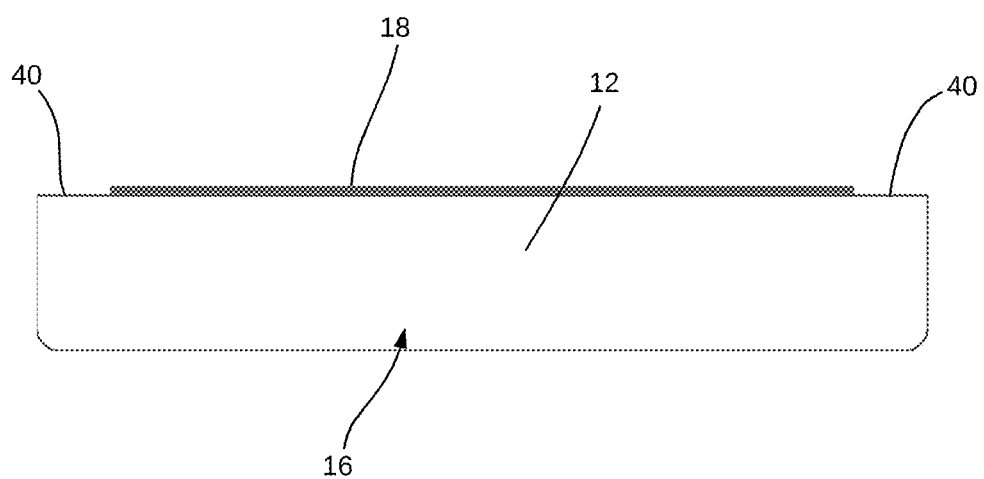
FIG. 9: is a plan view of the shelf shown in FIG. 8.

The length of the first connector 18 is less than the width of the shelf 12 at the rear side, as shown in FIG. 8. The length of the second connector 22 is less than the width of the support panel 14, as shown in FIG. 5. Further, in this particular embodiment, the length of the first connector 18 is less than the length of the second connector 22.

The support panel 14 includes channels 36 at each end of the second connector 22. The channels 36 each extend in a direction generally parallel with the upper and lower grooves 28, 30 of the second connector 22. In this particular embodiment, the depth of the grooves 28, 30 is less than to the depth of the channels 36.

The geometry of the first and second channels 18, 22, and the channels 36 described above allows for engagement of the full length of the first connector 18 with the second connector 22 notwithstanding any variations in manufacturing tolerance, and/or any lateral offset of the shelf 12 with respect to the support panel 14 during assembly of the system 10.

The rear side of the shelf 12 includes a rear surface that is adjacent the first connector 18. The rear surface includes an upper portion 38 that is between the first connector 18 and the load bearing surface 16, two lateral portions 40 that are each between one of the ends of the first connector 18 and the corresponding side of the shelf 12, and a lower portion 42 that is beneath the first connector 18 with respect to the load bearing surface 16.

In this particular embodiment, the rear surface surrounds the first connector 18. Further, the rear surface is planar. Consequently, the portions 38, 40, 42 of the rear surface are coplanar, as is evident from the Figures.

In the assembled furniture system 10, each of the upper portion 38, the lateral portions 40, and the lower portion 42 of the rear surface abut the outer face 20 of the support panel 14. In this way, the first and second connectors 18, 22 are concealed when viewed from above, from the sides, and from below the shelf 12. This has the advantage of providing a concealed connection between the shelf 12 and the support panel 14.

In the assembled furniture system 10, the abutment of the lower portion 42 of the rear surface with the outer face 20 establishes a second fulcrum when torque is applied to the shelf 12 by forces acting downwardly through the load bearing surface 16. The second fulcrum is established at the intersection between the lower portion 42 of the rear surface, and the underside surface 44 (which is on the opposite major face of the shelf 12 to the load bearing surface 16). The location of the second fulcrum is indicated in FIG. 16 by arrow S.

The support panel 14 includes a primary mounting point with which to mount the support panel 14 to an upright structure of a building. In this particular embodiment, the furniture system 10 further includes a rear mount 46 that is configured to be fastened to the upright structure. The rear mount 46 includes a connecting member, which in this embodiment is in the form of a hooking formation 48. Further, the rear mount 46 includes a backing plate 50. In the example illustrated in FIG. 7, the hooking formation 48 is an elongate strip projecting obliquely from the backing plate 50.

The rear face 52 of the support panel 14 (which is opposite the outer face) has a complementary connecting element at the primary mounting point. The complementary connecting element interconnects with the hooking formation 48 of the rear mount 46. Thus, the support panel 14 is able to mount on the rear mount 46. As evident from FIGS. 2, 4 and 6, the complementary connecting element in this embodiment is in the form of an elongate slot 54 that is oblique to the rear face 52. Further, the elongate slot 54 extends transversely across the rear face 52.

Figure 2:
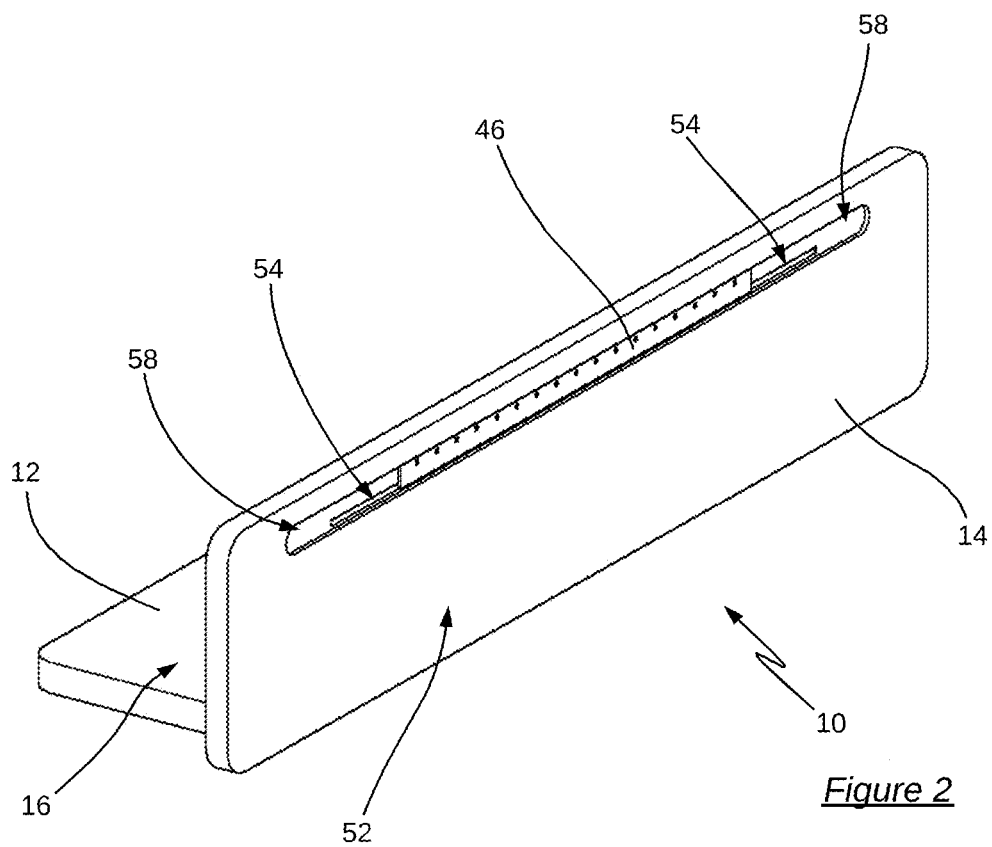
FIG. 2: is a rear perspective view of the furniture system shown in FIG. 1.
Figure 3:
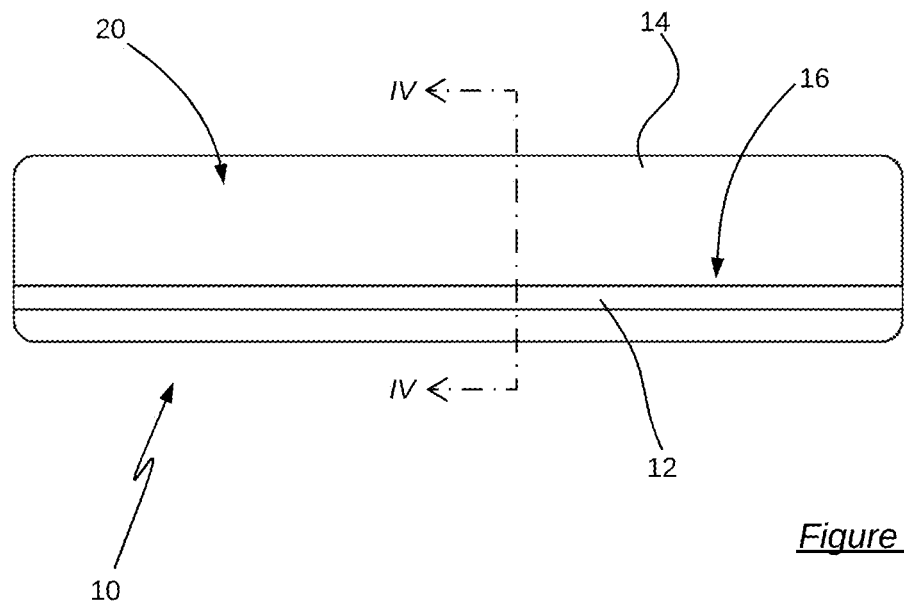
FIG. 3: is a front view of the furniture system shown in FIG. 1.

As is particularly shown in the cross section view of FIG. 2, the elongate slot receives the hooking formation 48 such that the support panel 14 is retained on the rear mount 46 by gravity.

The backing plate 50 of the rear mount 46 includes a set of countersunk screw holes 56. The rear mount 46 can be secured to the upright structure using a selection of the screw holes 56. The elongate slot 54 is longer than the hooking formation 48. Accordingly, the rear mount 46 can be secured at a desirable place on the upright structure (for instance, so that the screw fasteners can be positioned to be coincident with studs in a wall, and avoid any services—such as pipes, electrical and data wires, etc.), and the support panel 14 positioned in a desired position that may, or may not, correspond with the rear mount 46 being centred with respect to the elongate slot 54.

The rear face 52 of the support panel 14 includes a rebate 58. The opening of the elongate slot 54 is disposed within the rebate 58. The rebate 58 is dimensioned such that when the hooking formation 48 is interconnected with the elongate slot 54, the backing plate 50 is wholly disposed within the rebate. In other words, the rear face 52 is able to abut an upright surface of the upright structure to which the furniture system is mounted.

Figure 4:
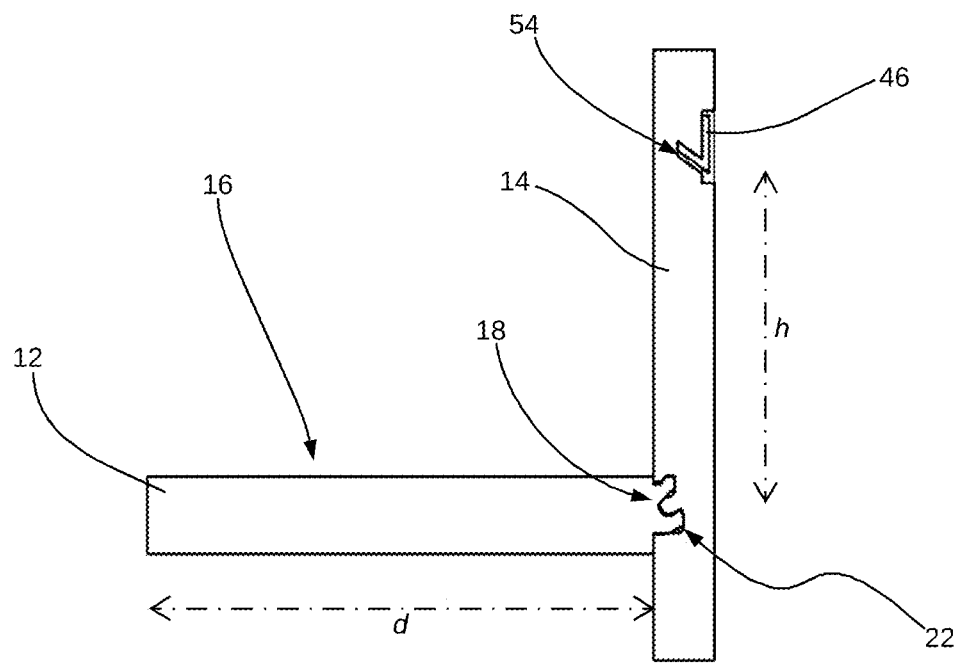
FIG. 4: is a vertical section of the furniture system, as viewed along the line IV-IV in FIG. 3.

The primary mounting is vertically spaced above the second connector 22. This provides the advantage of low torque loads acting on the rear mount 46, in the installed furniture system 10. In FIG. 4, the vertical separation of the rear mount 46 from the second connector 22 is indicated by double-headed arrow h, and the depth of the shelf 14 is indicated by double-headed arrow d. In this example, the ratio of the vertical separation h to shelf depth d is approximately 2:3. In other words, the vertically separation h of primary mounting point is from the second connector 22 is approximately two thirds of the depth d of the shelf 14.

The support panel 14 includes secondary mounting points with which to mount the support panel 14 to an upright structure of a building, if desired. In this particular embodiment, the secondary mounting points are provided within the channels 36. In this example, it is intended that self-driving screws can be passed through the channels 36 in the support panel 14 and located appropriately in the upright structure of the building. However, in some alternative embodiments, holes and/or slots may be provided within the channels 36 to co-operate with appropriate fasteners to retain the support panel 14 to the upright structure at the secondary mounting points. Utilizing the channels 36 for a mounting point has the benefit of being located in a horizontal plane that is coincident with the shelf 12.

FIGS. 17 to 22 show a furniture system 110 according to a second embodiment of the present invention. In FIGS. 17 to 22, components of the furniture system 110 that are substantially similar to those of the furniture system 10 have the same reference numerals with the prefix "1".

It will be immediately apparent from FIGS. 17 to 22 that the furniture system 110 has four shelves 112a, 112b, 112c, 112d (hereinafter referred to individually and non-specifically as "shelf 112", and collectively as "shelves 112"). Each of the shelves 112 is substantially similar to the shelf 12 of the embodiment shown in FIG. 1. To this end, each shelf 112 has a first connector 118.

To accommodate the four shelves 112, and the support panel 114 includes four second connectors 122a, 122b, 122c, 122d (hereinafter referred to individually and non-specifically as "second connector 122", and collectively as "second connectors 122") that are vertically spaced along the outer face 120. In the assembled furniture system 110, the first connector 118 of each shelf 112 is interconnected with a respective one of the second connectors 122.

In this particular embodiment, each first connector 118 has the same construction as the first connector 18 of the furniture system 10. Similarly, each second connector 122 has the same construction as the second connector 22 of the furniture system 10. Thus, assembly of the shelves 112 onto the support panel 114 follows the same procedure described in connection with FIGS. 11 to 16.

Due to the need to incline each shelf 118 relative to the support panel 114, it is easiest to first assemble the lowermost shelf 112d onto the support panel 114, then to proceed sequentially and upwardly with shelves 112c, 112b, and lastly to assemble the uppermost shelf 112a onto the support panel 114.

The support panel 114 includes channels 136 at each end of each second connector 122. Each channel 136 provides a secondary mounting point with which to mount the support panel 114 to an upright structure of a building, if and as desired.

FIGS. 23 to 27 show a furniture system 210 according to a third embodiment of the present invention. In FIGS. 23 to 27, components of the furniture system 210 that are substantially similar to those of the furniture system 10 have the same reference numerals with the prefix "2".

It will be immediately apparent from FIGS. 23 to 27 that the furniture system 210 has four shelves 212a, 212b, 212c, 212d (hereinafter referred to individually and non-specifically as "shelf 212", and collectively as "shelves 212"). Each of the shelves 212 is substantially similar to the shelf 12 of the embodiment shown in FIG. 1. To this end, each shelf 212 has a first connector 218.

In this particular embodiment, the support panel is formed of support panel modules 214a, 214b, 214c, 214d (hereinafter referred to individually and non-specifically as "module 214", and collectively as "modules 214") that are interconnectable to form a vertical array. Each module 214 has a second connector 222. Accordingly, a respective one of the shelves 212 can be assembled onto a respective one of the modules 214. In some alternative embodiments, two or more second connectors 222 may be provided to each module 214.

Figure 25:
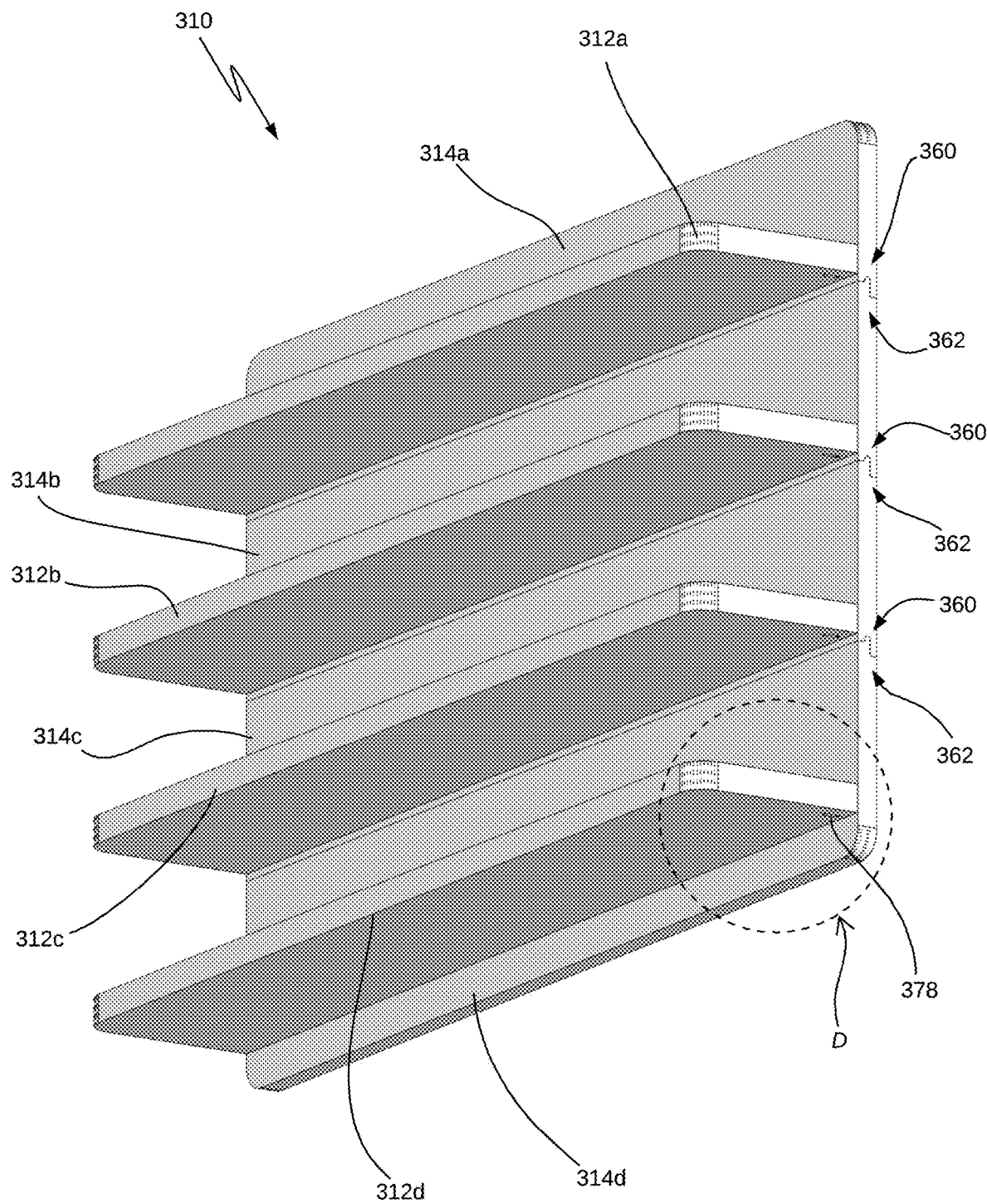
FIG. 25: is a front perspective view of a furniture system according to a fourth embodiment of the present invention.

The support panel has tongue and groove connections between the modules 214, whereby the support is assembled into the vertical array with the tongue and groove connections interconnected with one another. As shown in FIG. 25, in this embodiment, the top module 214a includes a groove formation 260 along its bottom edge. The bottom module 214d includes a tongue formation 262 along its top edge. The two intermediate support modules 214b, 214c each have groove formation 260 along its top edge, and a tongue formation 260 along its bottom edge, as shown in FIGS. 26 and 27.

In this example, the height of each module 214 is approximately equal to the depth of each shelf 214. It will be appreciated that furniture systems with a modular support panel, such as is illustrated in FIGS. 22 to 27, has the benefit of being able to be transported in a flat pack packaging arrangement.

Figure 26:
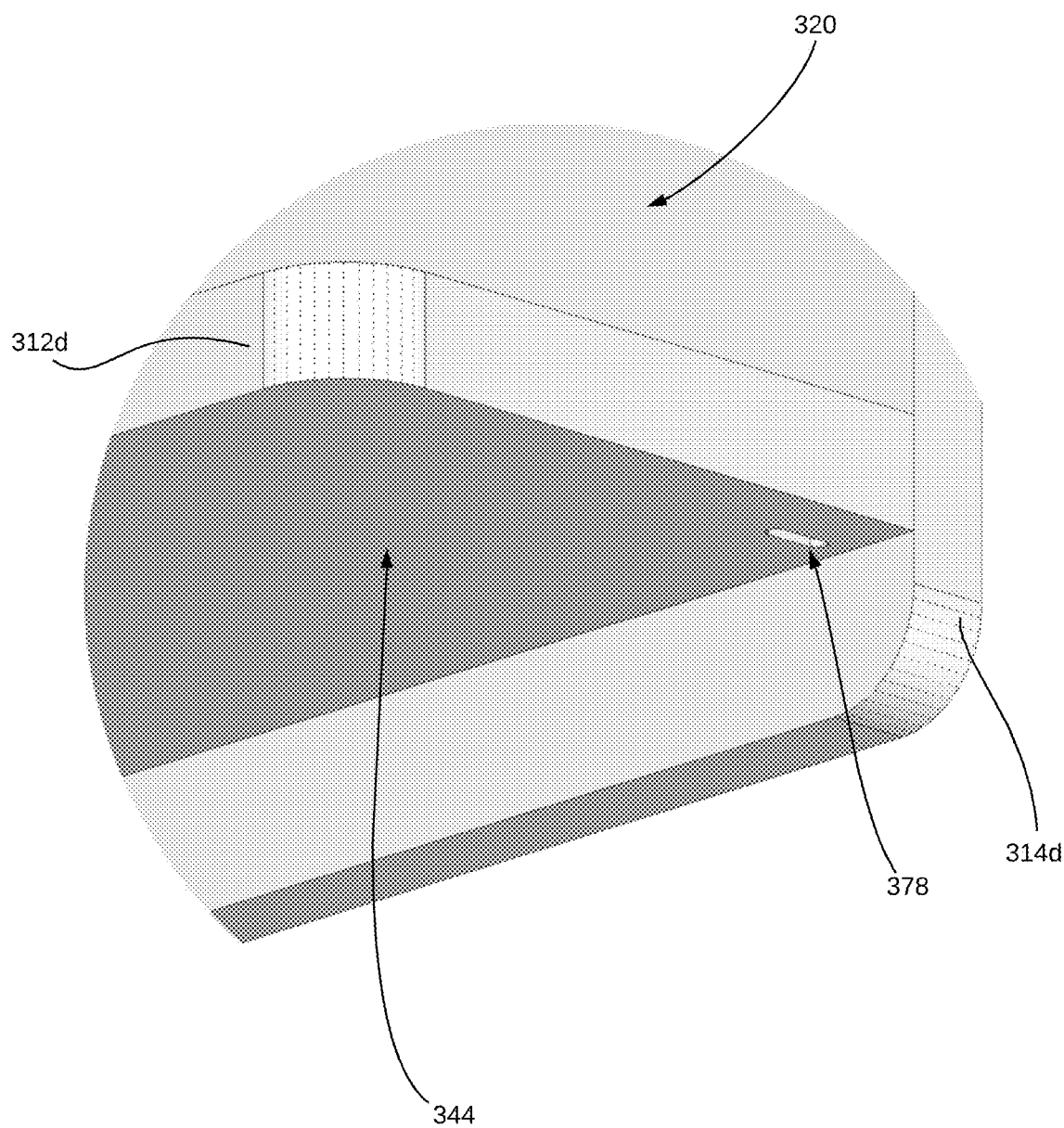
FIG. 26: is an enlarged view of Region D in FIG. 25.
Figure 28:
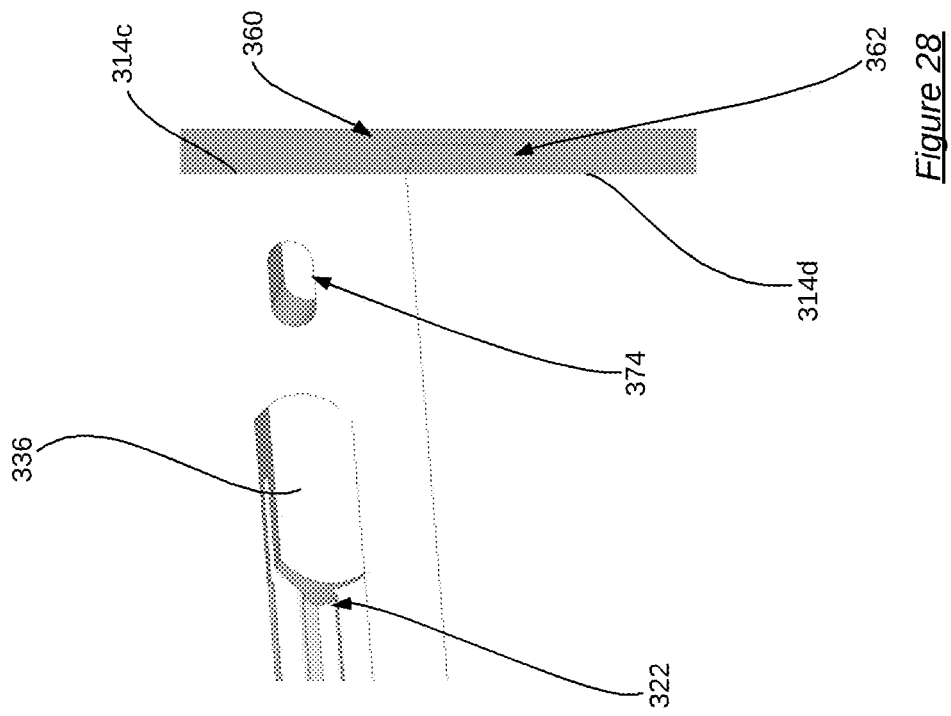
FIG. 28: is a partial front perspective view of the support panel of the furniture system shown in FIG. 25.
Figure 27:
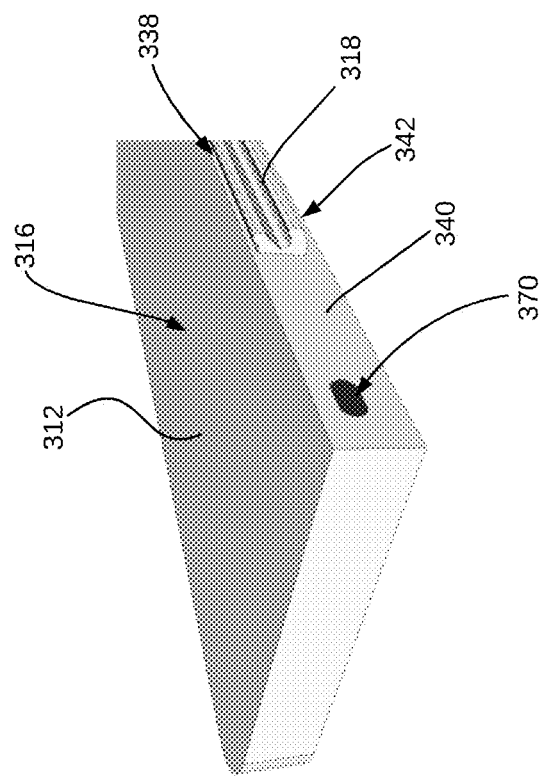
FIG. 27: is a partial rear perspective view of a shelf of the furniture system shown in FIG. 25.
Figure 29:
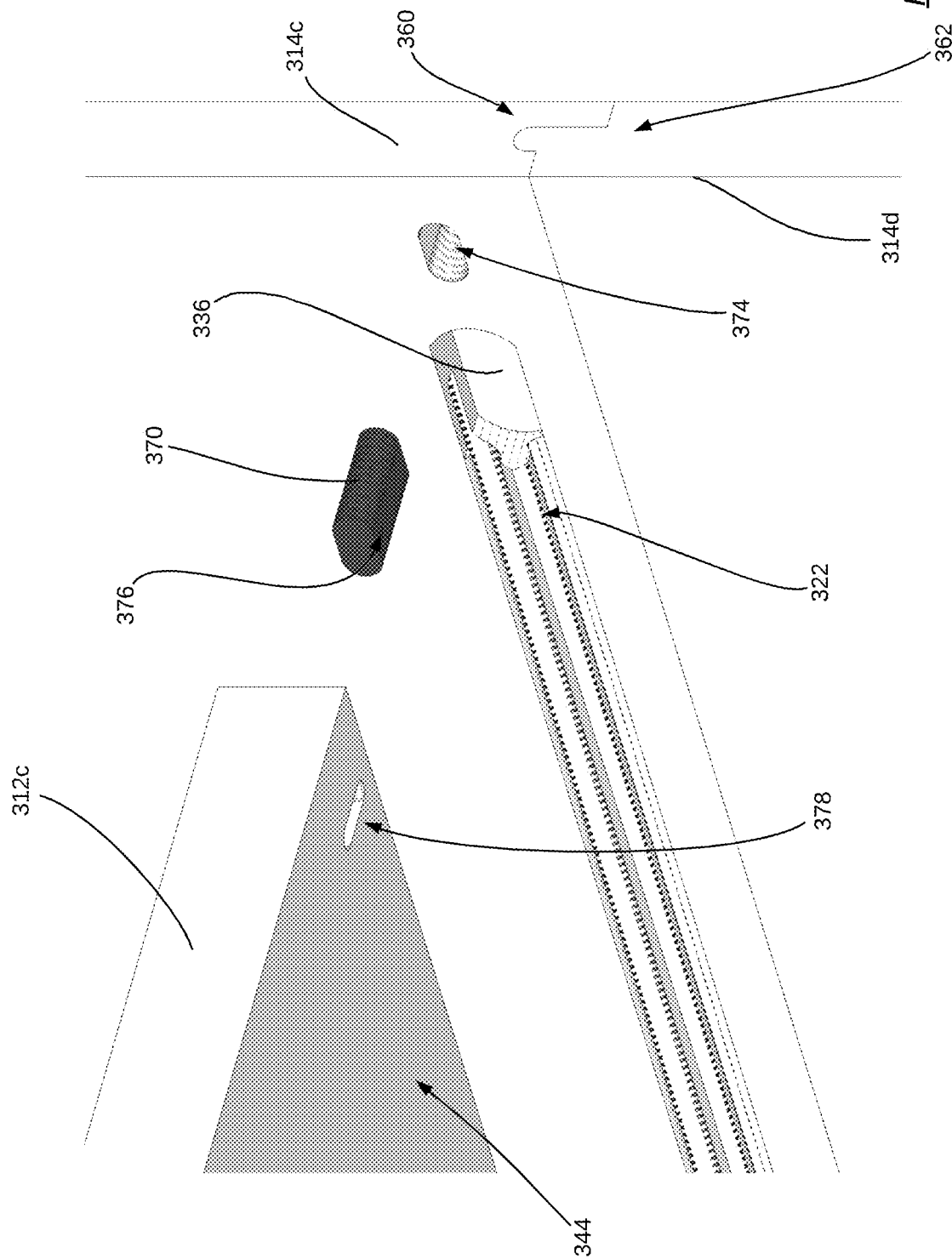
FIG. 29: is an exploded partial view of the furniture system of FIG. 25.
Figure 30:
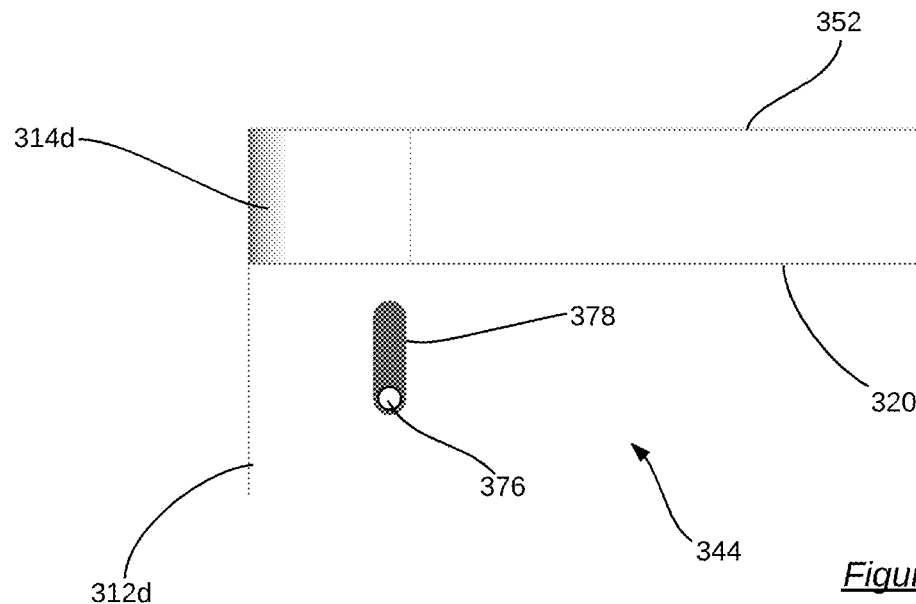
FIG. 30: is a partial bottom view of the furniture system of FIG. 25, showing the lock pin in an unlocked position.
Figure 31:
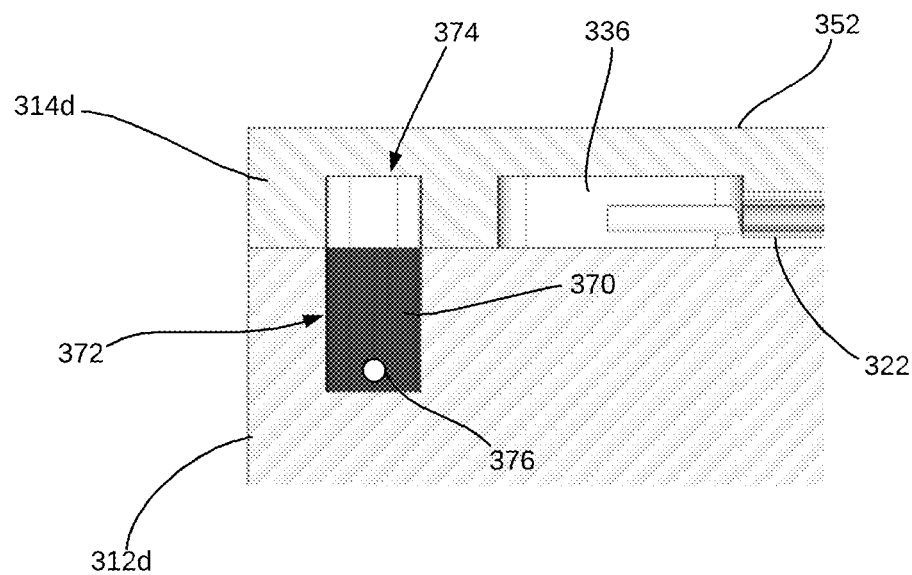
FIG. 31: is a horizontal section through the shelf as shown in FIG. 30.
Figure 32:
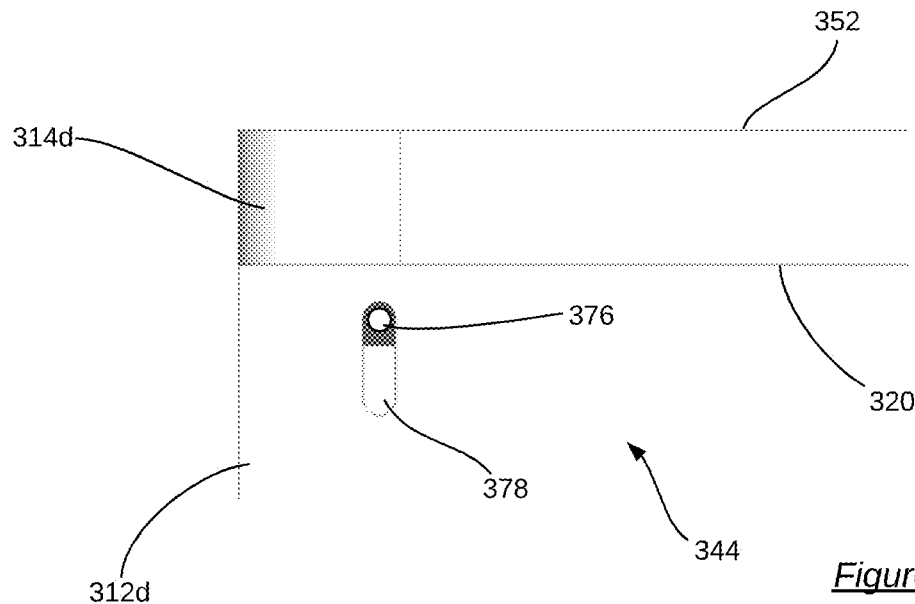
FIG. 32: is a partial bottom view of the furniture system of FIG. 25, showing the lock pin in an locked position.
Figure 33:
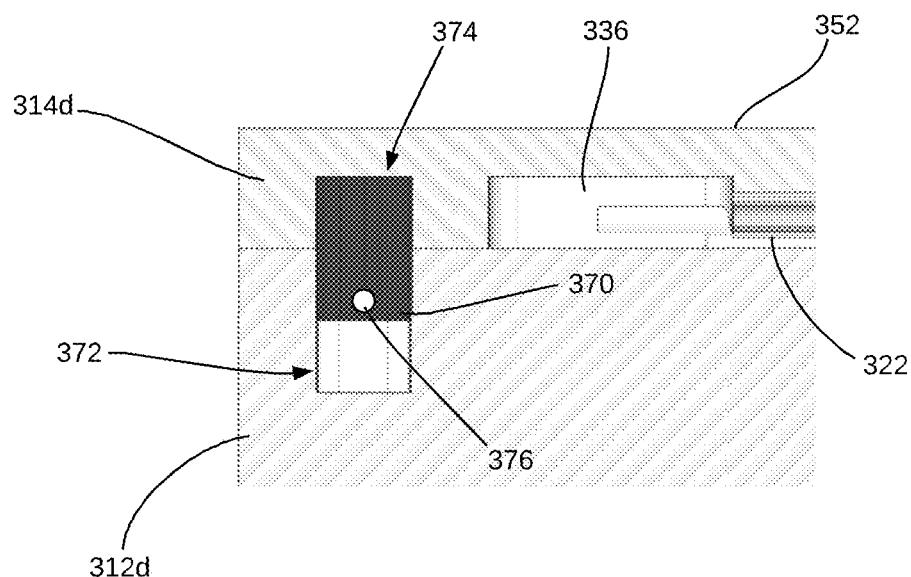
FIG. 33: is a horizontal section through the shelf as shown in FIG. 32.

As shown in FIGS. 26 and 27, each groove formation 260 includes a groove 264 on either side of a front lip 266 and rear lip 268. The rear lip 268 projects further from the groove than the front lip 266. Each rear lip 268 provides an additional mounting point with which to mount the support to an upright structure. To this end, in this example, it is intended that self-driving screws can be passed through the rear lip in each of the top and intermediate modules 214a, 214b, 214c and located appropriately in the upright structure of the building. In some alternative embodiments, holes and/or slots may be provided within the rear lips 268 to co-operate with fasteners to retain the top and intermediate support panel modules 214a, 214b, 214c to the upright structure. As will be appreciated, fasteners that locate in the rear lips 268 are concealed within the tongue and groove connections between the modules 214.

The bottom module 214d is secured to the upright structure with fasteners that extend through the channels 236 adjacent the lateral ends of the second connector 222. Each of the intermediate and bottom support panel modules 214b, 214c, 214d is vertically supported by the fasteners that pass through the module 214 and into the support structure. The upper edges of the intermediate and bottom support panel modules 214b, 214c, 214d is retained against the upright structure by virtue of the tongue and groove connections.

FIGS. 28 to 36 show a furniture system 310 according to a fourth embodiment of the present invention. In FIGS. 28 to 36, components of the furniture system 210 that are substantially similar to those of the furniture system 10 have the same reference numerals with the prefix "3".

The furniture system 310 is similar to the furniture system 210, in that it has four shelves 312a, 312b, 312c, 312d (hereinafter referred to individually and non-specifically as "shelf 312", and collectively as "shelves 312"), and four support panel modules 314a, 314b, 314c, 314d (hereinafter referred to individually and non-specifically as "module 314", and collectively as "modules 314").

Each shelf 314 of the furniture system 310 includes a catch that, in the assembled furniture system 310, is configurable to inhibit disassembly of the respective shelf 312 from the respective module 314. More particularly, each catch is capable of inhibiting a disassembly rotation of the respective shelf 314 about the hinge (formed by the upper tongue and groove pair 324, 328) that would cause disengagement of the lower tongue and groove pair 326, 330.

The catches are described in further detail in reference to FIGS. 30 to 36, which shows a single catch. It will be appreciated that the other catches in this embodiment are of identical form and function.

When the shelf 312 is assembled onto the module 314, the catch can be toggled between a blocking position in which the catch inhibits a disassembly rotation of the shelf 312, and an open position in which the catch does not inhibit a disassembly rotation of the shelf 312. To this end, in this embodiment when the catch is in the blocking position, an interference is formed between the catch and both the shelf 312 and the support 314.

In this embodiment, the catch includes a pin 370, a guide hole 372 that is formed in the shelf 314 and has an opening on the rear side of the shelf 314. The pin 370 is able to reciprocate within the guide hole 372. To this end, the pin 370 is able to move between a retracted position in which the pin 370 is wholly located within the guide hole 372, and an extended position in which the pin 370 projects outwardly from within the guide hole 372.

A pocket 374 is formed in the module 314. The pocket 374 is shaped to receive the pin 370. Further, the pocket 374 is positioned so that when the shelf 314 is assembled onto the module 314, the pin 370 can be moved to the extended position.

As will be appreciated, the pin 370 being in the retracted position corresponds with the catch being in the open position. Further, pin 370 being in the extended position corresponds with the catch being in the blocking position. When the catch is in the blocking position, the pin 370 is disposed in both the guide hole 372 and the pocket 374.

The pin 370 has a toggle hole 376 (shown most clearly in FIGS. 33 to 36) that extends transversely to the reciprocating direction of the pin 370. The shelf 314 has an access slot 378 that intersects the guide hole 372, and opens onto the underside surface 344 of shelf 314. A tool (such as an screw driver, not shown) can be passed through the access slot 378 and located in the toggle hole 376. In this way, the pin 370 can be toggled between the retracted and extended positions; and the catch can be moved between the open and blocking positions.

In the illustrated embodiment, the pin 370 and guide hole 372 are shaped to prevent rotation of the pin 370 within the guide hole 372. This has the advantage of ensuring that the pin 370 is maintained in an orientation with toggle hole 376 towards the access slot 378. In this particular example, the pin 370 and guide hole 372 have the cross-sectional shape of a geometric stadium.

Furthermore, in the illustrated embodiment, the pocket 374 has a cross-sectional shape that corresponds with the cross-sectional shape of the pin 374; in other words, the pocket 374 has the cross-sectional shape of a geometric stadium. However, it will be appreciated that the pocket can have a cross-sectional shape that does not match that of the pin, whilst still being capable of establishing an interference with the pin to inhibit the disassembly rotation described above.

Figure 34A:
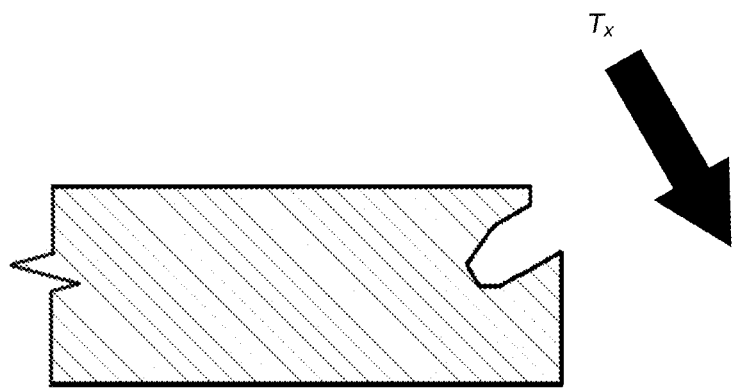
FIGS. 34a to 34c: are partial vertical sections illustrating three stages in the formation of the first connector of the shelf of FIGS. 8 and 9, according to a fifth embodiment of the present invention.
Figure 34B:
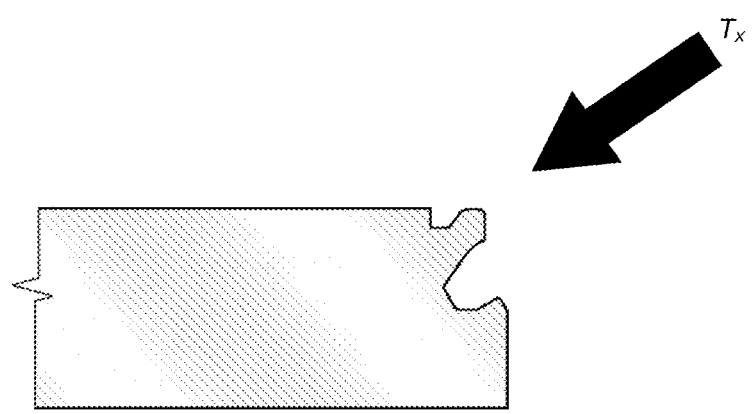
Figure 34C:
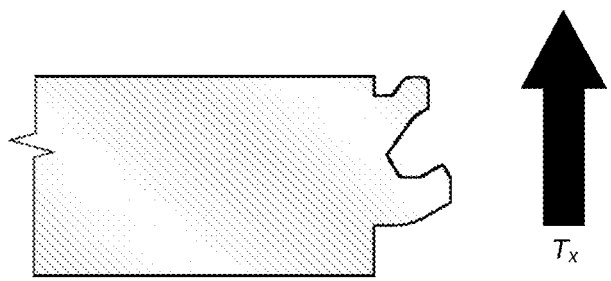

A method of manufacturing a shelf of a furniture system is also provided. One embodiment of the shelf manufacturing method is described herein by way of example only, with reference to the shelves 12, 112, 212 of FIGS. 1 to 24, and the shelf 312 of FIGS. 25 to 33. In addition, FIGS. 34a to 34c show stages in an example of the shelf manufacturing method. In the description that follows, statements made in respect of "shelf 12" (including component parts thereof) are to be understood to be applicable to the shelves 112, 212, 312, except where the context necessitates otherwise.

The shelf manufacturing method of this embodiment involves forming the shelf 12 from a shelf blank. The shelf blank, before commencement of the method has a rear edge, two lateral edges, and two opposing major surfaces. A first of the two opposing major surfaces will either form the load bearing surface 16, or form a substrate for the load bearing surface in the completed shelf Forming the shelf 12 further involves:
forming a profiled surface in a region adjacent the rear edge of the shelf blank by one or more material removal operations that each remove material from the shelf blank, a portion of the profiled surface including the first connector 16; and
docking material from the shelf blank in two regions that are each adjacent the rear edge and a respective one of the lateral edges.

Thus, in the completed shelf 12, the length of the first connector is less than the width of the shelf at the rear side of the load bearing surface.

The step of forming the profiled surface of this particular embodiment is described in further detail with reference to FIGS. 34a to 34c, and FIG. 10. FIGS. 34a to 34c are vertical cross sections through a rear portion of the shelf 12, at the middle of the shelf blank (for example, coincident with the line IV-IV in FIG. 3). This particular step involves three distinct material removal operations, as follows:

1. removing material from the shelf blank to form the lower surface of the upper tongue 24, and a first portion of the upper surface of the lower tongue 26—see FIG. 34a;
2. removing material from the shelf blank to form:
the upper surface of the upper tongue 24,
the upper portion 38 of the rear surface that, in the completed shelf 12 surrounds the first connector 16, and
a second portion of the upper surface of the lower tongue 26 thereby forming the upwardly projecting lip 32—see FIG. 34b; and
3. removing material from the shelf blank to form:
the lower surface of the lower tongue 26, and
the lower portion 42 of the rear surface that, in the completed shelf 12 surrounds the first connector 16.

It will be appreciated that the above three material removal operations can be completed in any order, and do not need to be completed in the above described order.

The first material removal operation described above forms the channel formation that is between the upper and lower tongues 24, 26, and that, in the assembled system 10, is to receive the ridge formation 31 of the second connector 22.

The docking material steps can occur after forming the profiled surface. When completed in this order, the profiled surface is formed in the shelf blank. The docking material steps then involve removing material from the shelf blank, including removing material from the profiled surface, so as to form two ends of the first connector.

In some alternative embodiments, the docking material steps can occur before forming the profiled surface. In some other alternative embodiments, the docking material steps can occur concurrently with forming the profiled surface.

The material removal operations can conveniently be performed with one or more rotary cutting tools that each move relative to the shelf blank in a direction that is parallel to the major surfaces of the shelf blank. By way of example, a CNC machine with a movable head fitted with appropriate rotary cutting tools can form the profiled surface. In such an example, the rotary cutting tools are moved relative to the shelf blank.

In each of FIGS. 34a to 34c, the bold arrow labelled $T_x$ indicates a suitable rotational axis for a rotary cutting tool to remove material so as to form remove the corresponding portion of the profiled surface for the first connector 16.

The method can further involve removing material from the shelf blank to form a blind hole that is to correspond with a guide hole 372 in the completed shelf. The blind hole extends inwardly into the shelf blank in a direction parallel to at least the first of the opposing major surfaces. In other words, in the completed shelf 312, the guide hole 372 is parallel to the load bearing surface 316. In the embodiment of FIGS. 25 to 33, the guide hole 372 is also parallel to the underside surface 344. Further, in this particular embodiment, the guide hole 372 is also parallel to the sides of the shelf 12.

The guide hole 372 is shaped to receive the pin 370 of the furniture system 310. In the completed shelf 312, the guide hole 372 opens onto the rear side of the shelf 312, and the pin 370 can be wholly located within the guide hole 372. Consequently, the step of forming the blind hole in the shelf blank involves forming a blind hole to a depth sufficient such that, in the completed shelf, the pin 370 can be wholly located within the guide hole 372. Alternatively or additionally, the step of forming the blind hole in the shelf blank involves forming a blind hole having a cross-sectional shape that matches that of the pin 370.

The method can further involve removing material from the shelf blank to form an access slot 378 that, in the completed shelf 312, extends transversely with respect to the guide hole 372, intersects with the guide hole 372, and opens onto the major surface of the shelf blank that is correspond with the underside surface 344 in the completed shelf 312. As will be appreciated, the access slot 378 can be formed before, or after the formation of the guide hole 372.

Figure 35A:
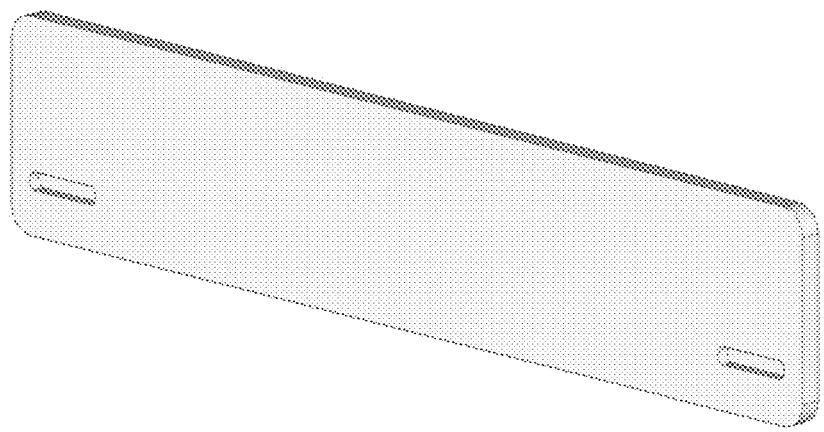
FIG. 35a: is a front perspective view illustrating a stage in the formation of the support panel of FIG. 5, according to a sixth embodiment of the present invention.

A method of manufacturing a support of a furniture system is also provided. One embodiment of the support manufacturing method is described herein by way of example only, with reference to the supports 14, 114 of FIGS. 1 to 20, and the support modules 214, 314 of FIGS. 21 to 33. In addition, FIGS. 35a to 34d show stages in an example of the shelf manufacturing method. In the description that follows, statements made in respect of "support 14" (including component parts thereof) are to be understood to be applicable to the support 114, and the support modules 214, 314, except where the context necessitates otherwise.

The support manufacturing method of this embodiment involves forming the support 14 from a support blank. The support blank, before commencement of the method, has a bottom edge, two lateral edges, and two opposing major surfaces. A first one of the major surfaces will either form the outer face 20, or form a substrate for the outer face in the completed shelf Forming the support 14 further involves, for each second connector 22 in the completed support 14:

forming a profiled surface within the support blank by one or more material removal operations that each remove material from the support blank in a direction that is generally inwardly from the first major surface towards the other of the major surfaces, a portion of the profiled surface including the second connector 22; and forming two recessed surfaces in the shelf blank that are each recessed with respect to the first major surface.

In the completed support 14, each second connector 22 extends between two recessed surfaces.

Thus, the length of each second connector 22 is less than the width of the support blank between the lateral edges.

In this embodiment described with reference to FIGS. 5 and 35a, each of the recessed surfaces is positioned inwardly of the lateral edges of the support blank. Each recessed surface forms one of the channels 36 in the support 14.

As indicated by FIG. 35a, forming the recessed surfaces can occur prior to forming the profiled surface that includes the second connector 22. Each recessed surface provides a void that facilitates tooling access while forming the profiled surface, as described in further detail below.

Figures 35B, 35C, 35D:
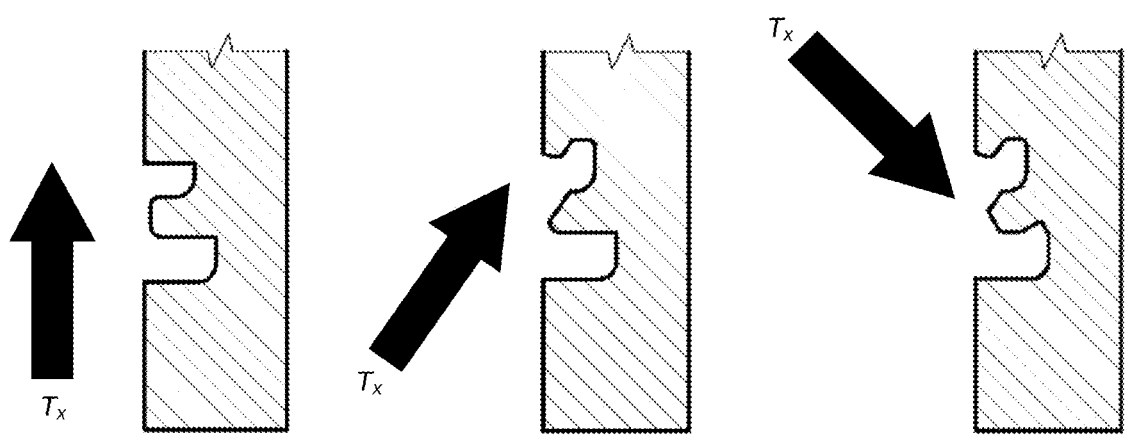
FIGS. 35b to 35d: are partial vertical sections illustrating three stages in the formation of the second connector of the support panel of FIG. 5, according to the sixth embodiment of the present invention.

The step of forming the profiled surface of this particular embodiment is described in further detail with reference to FIGS. 35b to 35d, and FIG. 10. FIGS. 35b to 35d are vertical cross sections through a lower portion of the support 14, at the middle of the support blank (for example, coincident with the line IV-IV in FIG. 3). This particular step involves three distinct material removal operations, as follows:

1. removing material from the support blank to form the lower surface of the upper groove 28, and the lower surface of the lower tongue 30—see FIG. 35b;
2. removing material from the shelf blank to form the upper surface of the upper groove 28, and the upper surface of the ridge formation 31—see FIG. 35c; and
3. removing material from the shelf blank to form the upper surface of the lower groove 30 (including the complementary-shaped recess 34 that is to receive the upwardly projecting lip 32 of the lower tongue 26), and the lower surface of the ridge formation 31—see FIG. 35d.

It will be appreciated that the above three material removal operations can be completed in any order, and do not need to be completed in the above described order.

Each of the material removal operations for the step of forming the profiled section involves removing material from the support blank in a direction that is generally parallel to the bottom edge of the support blank. However, because in this embodiment the length of each second connector 22 is less than the width of the support 14, it is necessary to move the required cutting tools inwardly and outwardly with respect to the first major surface. The voids formed by the recessed surfaces provide a clear space to perform the inward and outward movements, whilst maintaining clean ends to the second connector 22.

The material removal operations can conveniently be performed with one or more rotary cutting tools that each move relative to the support blank in a direction that is generally parallel to the major surfaces of the support blank, and also in a direction that is generally parallel to the bottom edge of the support blank. By way of example, a CNC machine with a movable head fitted with appropriate rotary cutting tools can form the profiled surface. In such an example, the rotary cutting tools are moved relative to the support blank.

In each of FIGS. 35b to 35d, the bold arrow labelled $T_x$ indicates a suitable rotational axis for a rotary cutting tool to remove material so as to form the corresponding portion of the profiled surface for the second connector 22.

The method can further involve removing material from the support blank to form at least one pocket that extends inwardly into the support blank from the first of the major surfaces and that is shaped to receive a pin 370 of the furniture system 310.

In embodiments in which the support manufacturing method forms a support module 214, 314 of the furniture system 210, 310, the method further involves removing material from at least a portion of the bottom edge of the support blank to form a groove formation 260, 360 in the completed support module 214, 314. Alternatively or additionally, the support manufacturing method involves removing material from at least a portion of the top edge of the support blank to form a tongue formation 262, 362 in the completed support module 214, 314.

For the purposes of this specification, it will be understood that the term "shelf" includes other furniture items, and component parts of a furniture system (such as the top board, and or bottom board of a cabinet carcass, and internal shelves of a cabinet), that are cantilevered from an upright structure of a building. It will also be understood that the term "load bearing surface" merely implies a surface of the shelf that is shaped or otherwise configured to receive a load, if required.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A furniture system comprising:
   at least one shelf that has a load bearing surface, a front side, and a rear side with a first connector; and
   a support that is to be mounted to an upright structure of a building, the support having an outer face that includes at least one second connector, the first and second connectors being configured to interconnect such that, assembled, in the furniture system:
   the shelf is supported by the support with the load bearing surface projecting horizontally away from the upright structure, the first and second connectors resist rotation of the shelf about the first and second connectors by a force acting downwardly through the load bearing surface, and the first and second connectors resist disconnection of the shelf from the support by force applied to the shelf in a direction that is normal to the support, wherein:

the first and second connectors have a first interlocking tongue and groove pair, and a second interlocking tongue and groove pair, the tongues of the first and second interlocking tongue and groove pairs extend in a direction so as to be parallel to the load bearing surface of the shelf when the furniture system is assembled, and the shelf is assembled onto the support by:

positioning the shelf with respect to the support such that the first interlocking tongue and groove pair form a hinge about which the shelf can pivot, and such that the second interlocking tongue and groove pair are substantially disengaged, and pivoting the shelf with respect to the support about the hinge, thereby forcing the second interlocking tongue and groove pair into engagement.

2. The furniture system according to claim 1, wherein the rear side of the shelf further comprises a rear surface that is adjacent the first connector and that includes an upper portion, wherein in the assembled furniture system the upper portion abuts the outer face of the support such that the first and second connectors are concealed when viewed from above the shelf.

3. The furniture system according to claim 2, wherein the rear surface includes a lower portion that is beneath the first connector with respect to the load bearing surface, wherein in the assembled furniture system the lower portion abuts the outer face of the support.

4. The furniture system according to claim 3, wherein in the assembled furniture system the first and second connectors are concealed by the abutment of the lower portion with the outer face when viewed from below the shelf.

5. The furniture system according to claim 3, wherein the lower portion of the rear surface is configured such that in the assembled furniture system the abutment of the lower portion with the outer face establishes a second fulcrum when torque is applied to the shelf by a force that acts downwardly through the load bearing surface.

6. The furniture system according to claim 1, wherein the support includes one or more mounting points for mounting the support to the upright structure, the mounting points including a first mounting point that is vertically spaced from the second connector.

7. The furniture system according to claim 1, wherein the first connector comprises upper and lower tongues that project rearwardly of the load bearing surface, and the second connector comprises upper and lower grooves formed in the support.

8. The furniture system according to claim 7, wherein the upper tongue and upper groove are configured such that, when the shelf is assembled on the support with the lower tongue located within the lower groove, the upper tongue is positively locked within the upper groove by complementary shaping of the upper tongue and upper groove.

9. The furniture system according to claim 7, wherein the lower tongue includes an upwardly projecting lip, and the lower groove has a complementary-shaped recess, and wherein, when the shelf is assembled on the support, the lip locates within recess to resist disconnection of the shelf from the support by force applied to the shelf in a direction that is normal to the support.

10. The furniture system according to claim 7, wherein the lower groove is shaped so that the lower tongue is deflected as the lower tongue and groove are brought into engagement.

11. The furniture system according to claim 7, wherein the lower tongue is in a substantially undeflected position when the lower tongue and groove are in a fully engaged position.

12. The furniture system according to claim 6, further comprising a rear mount that is configured to be fastened to the upright structure and that includes a connecting member, and wherein the support includes a rear face that is opposite the outer face, and a complementary connecting element formed on the rear face at the first mounting point, and wherein the connecting member interconnects with the complementary connecting element to retain the support on the rear mount.

13. The furniture system according to claim 1, further comprising a catch that, in the assembled furniture system, is configured or is configurable to inhibit disassembly of the respective shelf from the support.

14. The furniture system according to claim 13, wherein the catch is arranged such that when the shelf is assembled onto the support, the catch is able to toggle between a blocking position in which the catch inhibits a disassembly rotation of the shelf, and an open position in which the catch does not inhibit a disassembly rotation of the shelf.

15. The furniture system, according to claim 13, wherein the catch includes:

a pin, a guide hole that is formed in the shelf and has an opening on the rear side of the shelf, the pin being able to reciprocate within the guide hole between an open position and a blocking position, and a pocket formed in the support, the pocket being shaped to receive the pin, wherein:

when the catch is in the open position, the pin is at least substantially located within the guide hole, and when the shelf is assembled onto the support and the catch is in the blocking position, the pin projects outwardly from within the guide hole and into the pocket.

16. A method of manufacturing a shelf of a furniture system, the shelf having a load bearing surface, a front side, and a rear side with a first connector that is to interconnect with a complementary connector on a support of the furniture system, the method comprising forming the shelf from a shelf blank that has a rear edge, two lateral edges, and two opposing major surfaces one of which forms the load bearing surface, or forms a substrate for the load bearing surface;

wherein forming the shelf further includes forming a profiled surface in a region adjacent the rear edge of the shelf blank by one or more material removal operations that each remove material from the shelf blank, a portion of the profiled surface including the first connector; and docking material from the shelf blank in at least one region that is adjacent the rear edge and a respective one of the lateral edges;

whereby, in the completed shelf, the length of the first connector is less than the width of the shelf at the rear side of the load bearing surface.

17. The method according to claim 16, wherein the docking material step occurs after forming the profiled surface.

18. The method according to claim 16, wherein the material removal operations involved in forming the profiled surface are performed with one or more rotary cutting tools that each move relative to the shelf blank in a direction that is parallel to the major surfaces of the shelf blank.

19. The method according to claim 16, further comprising removing material from the shelf blank to form at least one blind hole that is to correspond with a guide hole in the completed shelf, the blind hole extending inwardly into the shelf blank in a direction parallel to at least the first major surface, wherein the blind hole is shaped to receive a pin of the furniture system.

20. The method according to claim 19, further comprising removing material from the shelf blank to form at least one access slot that extends transversely with respect to the guide hole, intersects with the guide hole, and opens onto the major surface of the shelf blank that is to be opposite the load bearing surface in the completed shelf.

\* \* \* \* \*